United States Patent Office 3,801,567
Patented Apr. 2, 1974

3,801,567
PROCESS FOR THE MANUFACTURE OF 6-AMINO-3-CARBONYLAMINO-PENAM COMPOUNDS
Karl Heusler, Basel, Switzerland, and Robert Burns Woodward, Cambridge, Mass., assignors to Ciba-Geigy Corporation, Ardsley, N.Y.
No Drawing. Filed June 30, 1970, Ser. No. 51,365
Claims priority, application Switzerland, July 8, 1969, 10,374/69
Int. Cl. C07d 99/16, 99/24
U.S. Cl. 260—239.1
9 Claims

ABSTRACT OF THE DISCLOSURE

The invention concerns a process for the manufacture of 6-amino-3-carbonylamino-penam and 7-amino-4-carbonylamino-ceph(2)em compounds by splitting the 6-acylamino and 7-acylamino groups in 6-acylamino-3-carbonylamino-penam and 7-acylamino-4-carbonylamino-ceph(2)em compounds by conversion into the imide halides, treatment with alcohols and cleavage of the imino ethers.

---

This invention relates to a process for the manufacture of amino compounds of the formula

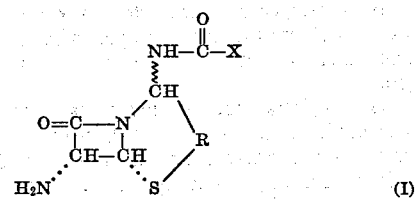

(I)

in which X represents an etherified hydroxyl or mercapto group and R represents a methyl group that may be substituted by one or two optionally substituted methyl groups, or a 1,2-ethenylene group which is substituted by an optionally substituted methyl group attached to the carbon atom of the 1,2-ethenylene group which in the sulphur-nitrogen ring is exclusively bound to ring carbon atoms. The compounds of the Formula I are obtained by reacting a compound of the formula

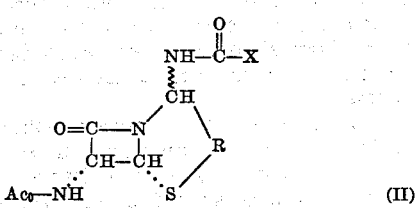

(II)

in which $Ac_0$ represents the acyl radical of an organic carboxylic acid, with an agent capable of forming an imide halide, converting the resulting imide halide into the corresponding imino ether and splitting the imino ether, and, if desired, converting the resulting compound into another compound of the Formula I, and/or, if desired, resolving a resulting mixture of isomers into the single isomers.

It is surprising that, in the process of the present invention, only one of the —C(=O)—NH-carbamoyl groups present in the starting material, namely, that of $Ac_0$—NH— grouping, is split, while that of the X—C(=O)—NH grouping remains intact.

In accordance with the process of the invention, as imide halide-forming agents, in which a halogen atom is bound to an electrophilic central atom, there may be used, in particular, acid halides, for example, acid bromides and, particularly, acid chlorides. There may be especially mentioned acid halides of inorganic acids, particularly of acids containing phosphorus, such as, phosphorus oxyhalides, phosphorus trihalides and especially phosphorus pentahalides, for example, phosphorus oxychloride, phosphorus trichloride and, primarily, phosphorus pentachloride, pyrocatechyl-phosphorus trichloride, as well as acid halides, especially acid chlorides, of acids containing sulphur or of carboxylic acids, for example, thionyl chloride, phosgene or oxalyl chloride.

The reaction of a starting material of the Formula II with the agent capable of forming an imide halide is preferably carried out in the presence of a suitable base, preferably an organic base, primarily a tertiary amine. As the tertiary amine, there may be especially mentioned, for example, a tertiary aliphatic monoamine or diamine, such as a tri-lower alkyl amine, for example trimethylamine, triethylamine or ethyldiisopropylamine, an N,N,N',N'-tetra-lower alkyl-lower alkylene-diamine, for example, N,N,N',N'-tetramethyl-1,5-pentylenediamine or N,N,N', N'-tetramethyl-1,6-hexylenediamine, a monocyclic or bicyclic monoamine or diamine, for example, an N-substituted, e.g. N-lower alkylated, alkylene- azaalkylene- or oxaalkylene-amine, for example, N-methylpiperidine or N-methylmorpholine, 2,3,4,6,7,8 - hexahydropyrrolo[1,2-a]pyrimidine (diazabicyclononene; DBN), a tertiary aromatic amine, such as a di-lower alkyl aniline, for example, N,N-dimethylaniline, and primarily a tertiary heterocyclic, monocyclic or bicyclic base, for example, quinoline or isoquinoline and especially pyridine. Approximately equimolar amounts of the agent used to form an imide halide and the base are preferably used. However, the amount of the base used can also be in an excess or in a smaller amount, for example, from about one-fifth of the equimolar amount up to about ten times the equimolar amount, especially from about three to five times the equimolar amount.

The reaction between the starting material and the agent capable of forming an imide halide is preferably carried out with cooling, for example, at a temperature within the range of from about +10° C. to about —50° C., although it can be carried out at a higher temperature, for example, at up to about 75° C., provided the stability of the starting material and products permits the use of an elevated temperature.

The imide halide product, which is usually further processed without being isolated, is subsequently reacted with an alcohol, preferably in the presence of one or more of the above-mentioned bases, to form the imino ether. As the alcohol there may be used, for example, an aliphatic or araliphatic alcohol, primarily an optionally substituted alcohol, such as an optionally halogenated, for example, chlorinated, lower alkanol or a lower alkanol containing additional hydroxyl groups. There may be especially mentioned, for example, ethanol, n-propanol, isopropanol or n-butanol, and especially methanol, or 2,2,2-trichloroethanol, as well as optionally substituted phenyl-lower alkanols, for example, benzyl alcohol. Usually an excess, for example, up to about a hundred-fold excess of the alcohol is used, and the reaction is preferably carried out with cooling, for example, at a temperature within the range of from about 10° C. to about —50° C.

The imino ether product is advantageously split without being isolated. Splitting of the imino ether to form the corresponding amino compound of the Formula I may be effected by treatment with a suitable hydroxy compound. Preferably water, or water mixed with an organic solvent, such as an alcohol, especially a lower alkanol, for example, methanol is used. The operation is generally carried out in an acidic medium, for example, at a pH of about 1 to about 5, which can be established, if necessary, by the addition of a basic agent, such as an aqueous alkali metal hydroxide, for example, sodium hydroxide or potassium hydroxide, or of an acid, such as a mineral acid or an organic acid, for example, hydrochloric acid, sulphuric acid, phosphoric acid, fluoroboric acid, trifluoroacetic acid or p-toluenesulphonic acid.

The three-step process described above is advantageously carried out without isolation of the imide halide and imino ether intermediate products, generally in the presence of an organic solvent that is inert towards the reactants, for example, a hydrocarbon that may be halogenated, such as methylene chloride, and/or in an inert gas atmosphere, for example, a nitrogen atmosphere.

The resulting compound may subsequently be converted into another compound of the Formula I. For example, an aliphatically bound chlorine or bromine atom present in the radical X, for example, in a 2-bromoethoxy radical, can be replaced by an iodine atom upon treatment with a suitable iodine salt, such as an alkali metal iodide, for example, potassium iodide, in a suitable solvent, such as acetone.

Mixtures of isomers obtained in accordance with the above process can be resolved into the single isomers by methods known per se, for example, by fractional crystallization, adsorption chromatography (column or thin-layer chromatography) or some other suitable separating process. Resulting racemates with salt-forming groups or compounds, into which suitable substituents can be temporarily introduced with a view to racemate cleavage, can be resolved in known manner into the antipodes, for example, by the formation of a mixture of diastereoisomeric salts with optionally active, salt-forming agents, separation of the mixture into the individual diastereoisomeric salts and conversion of the separated salts into the free compounds or by fractional crystallization from optically active solvents.

The above procedure also includes those modifications, according to which compounds resulting as intermediates are used as starting materials and the remaining step(s) is(are) carried out with these, or the procedure is interrupted at any stage; furthermore, the starting materials used in the process may be used in the form of derivatives, for example, in the form of their salts or formed during the reaction.

Advantageously those starting materials are used and those reaction conditions are chosen, which lead to the formation of the particularly preferred compounds.

In a starting material of the Formula II and in a product of Formula I resulting therefrom, the radical X is preferably a hydroxyl group etherified by an organic radical, but may also be a mercapto group similarly etherified, the organic radical being an aliphatic, cycloaliphatic, cycloaliphatic-aliphatic, aromatic, araliphatic, heterocyclic or heterocyclic-aliphatic radical.

Any methyl groups present in the radical R may be substituted, preferably by functional groups which may preferably be functionally modified. There may be especially mentioned functionally modified hydroxy groups, as well as functionally modified mercapto or carboxyl groups. The methylene radical R is preferably substituted by two methyl groups, one of which can be substituted by a functional group, especially an esterified hydroxyl group. In the 1,2-ethylene radical R, the methyl radical optionally containing, for example, an esterified or etherified hydroxyl or mercapto group or a functionally modified carboxyl group, substitutes the carbon atom of the 1,2-ethylene group which is bound to the other ring carbon atom of the sulphur-nitrogen ring, i.e. not to the ring sulphur atom.

An etherified hydroxyl or mercapto group present in a methyl substituent of the group R is primarily a hydroxyl or mercapto group etherified by an aliphatic or araliphatic radical. An esterified hydroxyl group may be, for example, an acylated hydroxyl group, in which the acyl radical may be the radical of an organic carboxylic acid, for example, an aliphatic, cycloaliphatic, cycloaliphatic-aliphatic, aromatic, araliphatic, heterocyclic or heterocyclic-aliphatic carboxylic acid, or the radical of a carbonic acid semi-derivative. A methyl substituent in the group R may also be substituted by a halogen atom, for example, a chlorine or a bromine atom. A functionally modified carboxyl group may be, for example, an esterified carboxyl group or a cyano group.

The acyl radical $Ac_0$ of an organic carboxylic acid present in the starting material of the Formula II represents the acyl radical of an aliphatic, cycloaliphatic, cycloaliphatic-aliphatic, aromatic, araliphatic, heterocyclic or heterocyclic-aliphatic carboxylic acid. Preferably, free functional groups, which may be present in the starting materials of the Formula II, for example, in the acyl radical $Ac_0$, may be protected in the usual way, hydroxyl, mercapto and amino groups by radicals that can be split off easily, for example, by hydrolysis, by reduction or by treatment with acid, for example, acyl radicals of carbonic acid semi-derivatives, such as carbonic acid semi-esters, for example, 2,2,2-trichloroethoxycarbonyl, tert.-butyloxycarbonyl or benzhydryloxycarbonyl radicals, or trityl groups, and carboxyl groups in the form of ester groupings that can be split easily, especially by reduction or by treatment with acid, for example, 2,2,2-trichloroethoxy - carbonyl, tert. - butyloxycarbonyl or benzhydryloxycarbonyl groups. Certain free functional groups, for example, free carboxyl or amino groups, can also be temporarily protected in known manner by organic silyl groups, for example, trimethylsilyl groups, or equivalent groups, such as the corresponding stannyl groups.

An aliphatic radical, including that of an aliphatic carboxylic acid, may be an optionally substituted aliphatic hydrocarbon radical, for example, an alkyl, alkenyl or alkynyl radical, especially a lower alkyl or lower alkenyl radical, as well as a lower alkynyl radical, which may contain, for example, up to 7, preferably up to 4, carbon atoms. If necessry, these radicals may be mono-, di- or polysubstituted by functional groups, for example, by one or more hydroxyl or mercapto groups, optionally etherified or esterified, for example, lower alkoxy, lower alkenyloxy or lower alkylenedioxy groups, optionally substituted phenoyloxy or phenyl-lower alkoxy groups, lower alkylmercapto groups or optionally substituted phenyl-mercapto or phenyl-lower alkyl mercapto groups, lower alkoxycarbonyloxy or lower alkanoyloxy groups, as well as halogen atoms, furthermore, nitro groups, optionally substituted amino groups, azido groups, acyl, for example, lower alkanoyl groups, or optionally functionally modified carboxyl groups, such as carbo-lower alkoxy or cyano groups.

A cycloaliphatic or cycloaliphatic-aliphatic radical, including that of a corresponding carboxylic acid, may be an optionally substituted cycloaliphatic or cycloaliphatic-aliphatic hydrocarbon radical, for example, a mono-, bi- or polycyclic cycloalkyl or cycloalkenyl group, or cycloalkyl or cycloalkylenyl-lower alkyl or -lower alkenyl group, respectively, in which a cycolalkyl radical contains up to 12, for example, 3 to 8, preferably 3 to 6, ring carbon atoms, and a cycloalkenyl radical up to 12, for example, 3 to 8, especially 5 to 8, but preferably 5 or 6 ring carbon atoms, as well as 1 or 2 double bonds; aliphatic portion of a cycloaliphatic-aliphatic radical may contain up to 7, preferbly up to 4, carbon atoms. If desired, the above cycloaliphatic or cycloaliphatic-aliphatic radicals may be mono-, di- or polysubstituted, for example, by one or more optionally substituted aliphatic hydrocarbon radicals, for example, the above-mentioned optionally substituted lower alkyl groups or, for example, like the above-mentioned aliphatic hydrocarbon radicals, by functional groups.

An aromatic radical including one of a corresponding carboxylic acid, may be an optionally substituted aromatic hydrocarbon radical, for example, a mono- bi- or polycyclic aromatic hydrocarbon radical, especially a phenyl radical, as well as a biphenyl or naphthyl radical that may be mono-, di- or polysubstituted, for example, like the above-mentioned aliphatic and cycloaliphatic hydrocarbon radicals.

An araliphatic radical, including that of an araliphatic carboxylic acid, may be, for example, an optionally subsituted araliphatic hydrocarbon radical, such as an optionally substituted aliphatic hydrocarbon radical containing, for example, up to three optionally substituted mono-, bi- or polycyclic aromatic hydrocarbon radicals, and represents primarily a phenyl-lower alkyl or phenyl-lower alkenyl, as well as a phenyl-lower alkynyl radical, such radicals containing, for example, 1 to 3 phenyl groups and, if desired, may be mono-, di- or polysubstituted in the aromatic and/or aliphatic portion, for example, like the above-mentioned aliphatic and cycloaliphatic radicals.

Heterocyclic radicals, including those in heterocyclic-aliphatic radicals and those in heterocyclic or heterocyclic-aliphatic carboxylic acids, are, in particular, mono-, as well as bi- or polycyclic, monoaza-, monothia-, monooxa-, thiaza-, oxaza-, diaza-, triaza- or tetraazacyclic radicals having aromatic characteristics which, if desired, may be mono-, di- or polysubstituted, for example, like the above-mentioned cycloaliphatic radicals. The aliphatic portion in a heterocyclic-aliphatic radical may be, for example, the same as the corresponding radicals in the above-mentioned cycloaliphatic-aliphatic or araliphatic groups.

The acyl radical of a carbonic acid semi-derivative is preferably the acyl radical of a corresponding semi-ester, in which the esterifying organic radical is an optionally substituted aliphatic, cycloaliphatic, aromatic or araliphatic hydrocarbon radical or a heterocyclic-aliphatic radical, primarily the acyl radical of an optionally substituted, preferably in α- as well as in β-position, lower alkyl semi-ester of the carbonic acid (that is to say, a lower alkoxycarbonyl radical which may be substituted in the lower alkyl portion, preferably in α- and in β-position), as well as a lower alkenyl, cycloalkyl, phenyl or phenyl-lower alkyl semi-ester of the carbonic acid that may be substituted in the lower alkenyl, cycloalkyl, phenyl or phenyl-lower alkyl portion (that is to say, a lower alkenyloxycarbonyl, cycloalkoxycarbonyl, phenyloxycarbonyl or phenyl-lower alkoxycarbonyl radical which may be substituted in the lower alkenyl, cycloalkyl, phenyl or phenyl-lower alkyl portion). Acyl radicals of a carbonic acid semi-ester are also corresponding radicals of lower alkyl semi-esters of the carbonic acid, in which the lower alkyl portion contains, for example, one of the above-mentioned heterocyclic groups having aromatic characteristics, it being possible for both the lower alkyl radical as well as the heterocyclic group to be substituted; acyl radicals of this kind are lower alkoxycarbonyl groups which may be substituted in the lower alkyl portion and which contain an optionally substituted heterocyclic group with aromatic characteristics in the lower alkyl radical.

The acyl radical of a carbonic acid semi-derivative may also be the acyl radical of a carbonic acid semiamide, in which the nitrogen atom can be mono- or disubstituted by aliphatic, cycloaliphatic, cycloaliphatic-aliphatic, aromatic or araliphatic radicals and especially lower alkyl groups.

As lower alkyl groups there may be especially mentioned, for example, a methyl, ethyl, n-propyl, isopropyl, n-butyl, isobutyl, sec.-butyl or tert.-butyl, n-pentyl, isopentyl, n-hexyl, isohexyl or n-heptyl group. Lower alkenyl radicals are especially, for example, a vinyl, allyl, isopropenyl, 2- or 3-methallyl or 3-butenyl group, and a lower alkynyl radical, for example, a propargyl or 2-butynyl group.

A cycloalkyl group is, for example, a cyclopropyl, cyclobutyl, cyclopentyl, cyclohexyl, cycloheptyl or adamantyl group, and a cycloalkyenyl group, for example, a 2- or 3-cyclopentenyl, 1-, 2- or 3-cyclohexenyl or 3-cycloheptenyl, also 2-cyclopropenyl group. A cycloalkyl-lower alkyl or -lower alkenyl radical is, for example, a cyclopropyl-, cyclopentyl-, cyclohexyl- or cycloheptylmethyl, -1,1- or -1, 2-ethyl-, -1,1-, -1,2- or 1,3-propyl, -vinyl or -allyl group, and a cycloalkenyl-lower alkyl or -lower alkenyl group is, for example, a 1-, 2- or 3-cyclopentenyl-, 1-, 2- or 3-cyclohexenyl- or 1-, 2- or 3-cycloheptenyl-methyl, -1,1- or -1,2-ethyl, -1,1-, -1,2- or 1,3-propyl, -vinyl or -allyl group.

The naphthyl radical may be a 1- or 2-naphthyl radical and a biphenylyl group may be, for example, a 4-biphenylyl radical.

The phenyl-lower alkyl or phenyl-lower alkenyl radical may be, for example, a benzyl, 1- or 2-phenylethyl, 1-, 2- or 3-phenylpropyl, diphenylmethyl, trityl, 1- or 2-naphthylmethyl, styryl or cinnamyl radical.

Heterocyclic radicals may be, for example, monocyclic monoaza-, monothia- or monooxacyclic radicals of aromatic character, for example, pyridyl, e.g. 2-pyridyl, 3-pyridyl or 4-pyridyl radicals, thienyl, e.g. 2-thienyl radicals, or furyl, e.g. 2-furyl radicals, or bicyclic monoazacyclic radicals having aromatic characteristics, for example quinolinyl, e.g. 2-quinolinyl or 4-quinolinyl radicals, or isoquinolinyl, e.g. 1-isoquinolinyl radicals, or monocyclic thiaza- or oxaaza-, as well as diazacyclic radicals having aromatic characteristics, for example, oxazolyl, isoxazolyl, thiazolyl or isothiazolyl, as well as pyrimidinyl radicals, tri- or tetraazacyclic radicals, preferably having aromatic characteristics, such as tetrazolyl radicals, for example, 1-tetrazolyl radicals. Heterocyclic-aliphatic radicals are heterocyclic-radical-containing lower alkyl or lower alkenyl radicals, the heterocyclic radicals being, in particular, those specified above.

Etherified hydroxyl groups are primarily lower alkoxy, for example, methoxy, ethoxy, n-propyloxy, isopropyloxy, n-butyloxy, isobutyloxy, sec.-butyloxy, tert.-butyloxy, n-pentyloxy or tert.-pentyloxy groups, as well as substituted lower alkoxy, such as halogeno-lower alkoxy groups, especially 2-halogeno-lower alkoxy groups, for example, 2,2,2-trichloroethoxy or 2-iodoethoxy groups, lower alkenyloxy, for example, vinyloxy or allyloxy groups, lower alkylenedioxy, e.g. methylene- or ethylene-, as well as isopropyidenedioxy groups, cycloalkoxy, for example, cyclopentyloxy, cyclohexyloxy or adamantyloxy groups, phenyloxy groups, phenyl-lower alkoxy, for example, benzyloxy or 1- or 2-phenylethoxy groups, or lower alkoxy groups substituted by monocyclic monoaza-, monooxa- or monothiacyclic groups having aromatic characteristics, for example, pyridyl-lower alkoxy, e.g. 2-pyridylmethoxy groups, furyl-lower alkoxy, e.g. furfuryloxy gorups, or thienyl-lower alkoxy, e.g. 2-thenyloxy groups.

Etherified mercapto groups may be lower alkylmercapto, for example, methylmercapto or ethylmercapto groups, phenylmercapto groups or phenyl-lower alkylmercapto, for example, benzylmercapto groups.

Esterified hydroxyl groups are primarily halogen atoms, for example, fluorine, chlorine, bromine or iodine atoms, as well as lower alkanoyloxy, for example, acetyloxy or propionyloxy groups.

Substituted amino groups are mono- and especially di-substituted amino groups, in which the substituents are primarily optionally substituted mono- or divalent aliphatic, cycloaliphatic, cycloaliphatic-aliphatic, aromatic or araliphatic hydrocarbon radicals, or acyl groups. Amino groups of the kind specified are, in particular, lower alkylamino or di-lower alkyl-amino, for example, methylamino, ethylamino, dimethylamino or diethylamino groups, or lower alkylene-amino groups, which may be interrupted by hetero, for example, oxygen or sulphur atoms, as well as nitrogen atoms which may be substituted by lower alkyl groups, for example, pyrrolidino, piperidino, morpholino, thiomorpholino or 4-methyl-piperazino groups, as well as acylamino, especially lower alkanoylamino, for example, acetylamino or propionylamino groups, and also phthaloylamino groups.

A lower alkanoyl radical may be, for example, an acetyl or propionyl group.

A lower alkoxycarbonyl radical may be, for example, a methoxycarbonyl, ethoxycarbonyl, n-propyloxycarbonyl, isopropyloxycarbonyl, tert.-butyloxy-carbonyl or tert.-pentyloxycarbonyl group.

Optionally N-substituted carbamoyl groups are, for example, N-lower alkyl- or N,N-di-lower alkyl-carbamoyl, for example, N-methyl-, N-ethyl, N,N-dimethyl- or N,N-diethylcarbamoyl groups.

A lower alkenyloxycarbonyl radical may be, for example, a vinyloxycarbonyl group, and cycloalkoxycarbonyl and phenyl-lower alkoxycarbonyl groups, in which the cycloalkyl or phenyl-lower alkyl radicals have the meanings given above, are, for example, admantyloxycarbonyl, benzyloxycarbonyl or diphenylmethoxycarbonyl groups, as well as α-4-biphenylyl-α-methylethoxycarbonyl groups. Lower alkoxycarbonyl groups, in which the lower alkyl radical contains, for example, a monocyclic monoaza-, monooxa- or monothiacyclic group are, for example, furyl-lower alkoxycarbonyl, e.g. furfuryloxycarbonyl groups, or thienyl-lower alkoxycarbonyl, e.g. 2-thenyloxycarbonyl groups.

The radical X primarily represents an etherified hydroxyl group, or a correspondingly etherified mercapto group which, together with the carbonyl grouping, forms an esterified carboxyl or thiocarboxyl group, which can easily be split under neutral or slightly acid conditions.

The group X in the starting material of Formula II and in the product corresponding to Formula I may represent, for example, the radical of the formula $—O—R_0^a$ which, together with the carbonyl grouping, represents an esterified carboxyl group that can easily be split by treatment with chemical reducing agents, for example, zinc or chromium(II) salts under neutral or slightly acid conditions. In this group, $R_0^a$ represents a 2-halogeno-lower alkyl radical, in which the halogen has an atomic weight of more than 19. The radical may contain one or more halogen atoms, primarily chlorine, bromine or iodine atoms, whereby 2-chloro-lower alkyl radicals in particular, but also 2-bromo-lower alkyl radicals, generally contain a plurality, preferably three, chlorine or bromine atoms, whereas a 2-iodo-lower alkyl radical preferably contains only one iodine atom. The radical $R_0^a$ represents in particular a 2-polychloro-lower alkyl, for example, a 2-polychloroethyl radical, primarily the 2,2,2-trichloroethyl, as well as the 2,2,2-trichloro-1-methylethyl radical, but it can also represent a 2-monobromo- or 2-polybromo-lower alkyl, for example, 2-bromo- or 2,2,2-tribromo-ethyl radical, or a 2-iodo-lower alkyl radical, for example, 2-iodoethyl radical.

A further group represented by the symbol X which, together with the carbonyl grouping, forms an esterified carboxyl group that can easily be split by treatment with a chemical reducing agent, for example, zinc or a chromium(II) salt, under neutral or slightly acid conditions, is the group $—O—M—R_0^b$, in which $R_0^b$ represents an arylcarbonylmethyl group. In this group the aryl radical may be a bicyclic or polycyclic and especially a monocyclic, optionally substituted aromatic hydrocarbon radical, for example, an optionally substituted naphthyl group and primarily an optionally substituted phenyl group. Substitutents of such groups may be, for example, optionally substituted hydrocarbon radicals, for example, lower alkyl, e.g. methyl, ethyl or isopropyl radicals, furthermore, trifluoromethyl groups, phenyl or phenyl-lower alkyl, for example, benzyl or phenyl-ethyl radicals, or functional groups, such as free or functionally modified carboxyl groups, for example, carboxy, lower alkoxycarbonyl, e.g. methoxycarbonyl or ethoxycarbonyl groups, furthermore, carbamoyl or cyano groups, optionally functionally modified, for example, esterified hydroxyl or mercapto groups, e.g. halogen atoms, or etherified hydroxyl or mercapto, for example, lower alkoxy groups, e.g. methoxy, ethoxy, n-propyloxy, isopropyloxy, n-butyloxy or tert.-butyloxy groups, and/or optionally substituted amino, for example, di-lower alkyl amino, e.g. dimethylamino or diethylamino, or lower alkanoylamino e.g. acetylamino groups.

The methyl portion of an arylcarbonylmethyl radical $R_0^b$ is preferably unsubstituted, but may be substituted by an organic radical, for example, an optionally substituted aliphatic hydrocarbon radical, such as, a lower alkyl radical, e.g. a methyl, ethyl, n-propyl, isopropyl, n-butyl or tert.-butyl group, or a cycloaliphatic, aromatic or araliphatic radical, such as an aryl, for example, an optionally substituted phenyl group, as well as an optionally substituted cycloalkyl, e.g. cyclohexyl group, or an optionally substituted phenyl-lower alkyl, for example, benzyl group.

The arylcarbonylmethyl radical $R_0^b$ is preferably an unsubstituted phenacyl radical, but may also be a phenacyl radical substituted in the aromatic portion by lower alkyl, for example, methyl groups, lower alkoxy, for example, methoxy groups, or halogen, for example, fluorine, chlorine or bromine atoms.

The group X may also be a radical of the formula $—O—R_0^c$ which, together with the carbonyl grouping, forms an esterified carboxy group which can easily be split upon irradiation, especially with ultraviolet light, under neutral or slightly acidic condtions. In this group, $R_0^c$ represents an arylmethyl group, in which the aryl portion is a bicyclic or polycyclic, and especially monocyclic, preferably substituted aryl radical. An aryl radical of this kind is primarily an optionally substituted phenyl group, but may also be a naphthyl, for example, a 1- or 2-naphthyl group. These groups may be substituted, for example, by optionally substituted hydrocarbon, for example, lower alkyl, phenyl or phenyl-lower alkyl radicals, which may contain as substituents a functional group as defined below, or primarily by functional groups, such as a free or functionally modified carboxyl group, for example, a carboxy group, a lower alkoxycarbonyl, e.g. methoxycarbonyl or ethoxycarbonyl group, a carbamoyl group or a cyano group, or an optionally substituted amino, for example, a di-lower alkyl-amino group, or an acyl group, for example, a lower alkanoyl, e.g. an acetyl group, but especially a functionally modified, for example, esterified hydroxyl or mercapto group, such as an acyloxy, for example, lower alkanoyloxy, e.g. acetyloxy group, or a halogen, e.g. fluorine, chlorine or bromine atom, and primarily an etherified hydroxyl or mercapto group, for example, a lower alkoxy, e.g. methoxy, ethoxy, n-propyloxy, isopropyloxy, n-butyloxy or tert.-butyloxy group, and also a lower alkylmercapto, e.g. methylmercapto or ethylmercapto group (which in the preferred phenyl radical are mainly in 3-, 4- and/or 5-position) and/or especially a nitro group (which in the preferred phenyl radical is primarily in the 2-position).

The methyl portion of an arylmethyl radical $R_0^c$ is preferably unsubstituted, but, if desried, may also be substituted, for example, like the methyl portion of the abovementioned arylcarbonylmethyl group $R_0^b$, by an optionally substituted hydrocarbon radical.

A radical $R_0^c$ is preferably an optionally substituted α-phenyl-lower alkyl or benzhydryl, for example, 1-phenylethyl or benzhydryl, and primarily benzyl radical, which may be substituted by lower alkoxy, for example, methoxy, preferably in the 3-, 4- and/or 5-position, and/or by nitro, preferably in the 2-position. There may be especially mentioned the 3- or 4-methoxy-benzyl, 3,5-dimethoxybenzyl, 2-nitrobenzyl and the 4,5-dimethoxy-2-nitrobenzyl radical.

The group X can also be a radical of the formula $—O—R_0^d$ which, together with the carbonyl grouping, forms an esterified carboxyl group which can easily be split under acidic conditions, for example, in the presence of formic, acetic or triufluoroacetic acid. A radical $R_0^d$ of this kind is primarily a methyl group monosubstituted by a carbocyclic aryl radical containing one or more electron-donating substituents, or by a heterocyclic group having aromatic characteristics containing one or more oxygen or sulphur atoms as ring members, or represents the ring member in the α-position to the ring oxygen atom or the ring sulphur atom in an oxa- or thiacycloaliphatic radical.

A carbocyclic aryl group containing an electron-donating substituent in the aryl radical may be a bicyclic or polycyclic, especially a monocyclic aryl radical, for example, a naphthyl or, especially, a phenyl radical. Electron-donating substituents, which are preferably in para-position and/or ortho-position of the aryl radical, are, for example, free or preferably functionally modified, for example, esterified and especially etherified hydroxyl groups, such as lower alkoxy, e.g. methoxy, furthermore, ethoxy or isopropyloxy groups, as well as the corresponding free or functionally modified mercapto groups, as well as aliphatic, cycloaliphatic, aromatic or araliphatic hydrocarbon radicals, which may contain suitable substituents, especially lower alkyl, e.g. methyl or tert.-butyl, or aryl, e.g. phenyl groups.

A heterocyclic group having aromatic characteristics and containing one or more oxygen or sulphur atoms as ring members may be bicyclic or polycyclic, but is preferably monocyclic, and is primarily a furyl, e.g. 2-furyl radical, or a thienyl, e.g. 2-thienyl radical.

An oxa- or thiacycloaliphatic radical linked in the α-position is primarily a 2-oxa- or 2-thiacycloalkyl group, as well as a 2-oxa- or 2-thia-cycloalkenyl group, in which the methyl group $R_0^d$ is the ring member adjacent to the ring oxygen atom or ring sulphur atom, and which preferably contains 4 to 6 ring carbon atoms. There may be especially mentioned the 2-tetrahydrofuryl, 2-tetrahydropyranyl and 2,3-dihydro-2-pyranyl radicals or a corresponding sulphur analogue.

The group $R_0^d$ is preferably a 4-methoxy- or 3,4-dimethoxy-benzyl group, a 2-tetrahydrofuryl group, a 2-tetrahydropyranyl group or a 2,3-dihydro-2-pyranyl group.

The radical R present in the starting material of the Formula II and in the product of the Formula I is primarily an isopropylidene group, but may also be a methylene or an esterified 3-hydroxy-, especially 3-acyloxy-2,2-propylidene group, furthermore a 2-methyl-1,2-ethenylene group, a functionally modified, for example, etherified or esterified 2-hydroxymethyl- or 2-mercaptomethyl-, for example a 2-acyloxymethyl- or 2-halogenomethyl-1,2-ethenylene group, or a functionally modified 2-carboxymethyl-, for example, 2-cyanomethyl-1,2-ethenylene group, wherein in the sulphur-nitrogen ring the carbon atom of the 1,2-ethylene grouping, which is bound to ring carbon atoms only, carries the optionally substituted methyl group. In the above-mentioned acyloxy groups, the acyl radical is derived from one of the above-mentioned organic carboxylic acids and is primarily a lower alkanoyl, for example, acetyl radical, or is the acyl radical of a carbonic acid semi-ester or -amide. An etherified hydroxyl or mercapto group optionally substituting the methyl radical is preferably a hydroxy or mercapto group etherified by aliphatic or araliphatic radicals, preferably a lower alkoxy or lower alkylmercapto group, whereas the halogen atom in a halogenomethyl-1,2-ethenylene group is, for example, a bromine atom.

The acyl radical $AC_0$ in the starting material of the Formula II is, in particular, the acyl radical of an organic carboxylic acid present in an N-acyl derivative of a 6-aminopenam-3-carboxylic acid compound or 7-aminocephem-4-carboxylic acid compound, for example, the radical of the formula $Y—(C_mH_{2m})—C(=O)—$, in which $m$ is an integer of from 0 to 4, preferably 1, and in which a carbon atom of the preferably unbranced alkylene radical of the formula $—(C_mH_{2m})—$ may be substituted by an optionally substituted amino group, a functionally modified, for example, etherified or esterified hydroxyl or mercapto group, or a free or functionally modified carboxyl group, for example, by one of the groups of this kind defined above, and in which Y represents an aromatic or cycloaliphatic hydrocarbon radical or a heterocyclic radical, the latter preferably having aromatic characteristics, these radicals being optionally substituted in the nucleus, for example, by one or more of the substituents specified above for the alkylene radical, as well as by optionally substituted sulpho groups or nitro groups, or stands for a hydroxyl or mercapto group etherified by an aromatic or cycloaliphatic hydrocarbon radical or heterocyclic radical, the latter preferably having aromatic characteristics, and represents for example, a phenylacetyl, phenyloxyacetyl, phenylthioacetyl, bromophenyl-thioacetyl, 2-phenyloxypropionyl, α-phenyloxyphenylacetyl, α-methoxyphenylacetayl, α-methoxy-3,4-dichlorophenylacetyl, α-cyanophenylacetyl, phenylglycyl (optionally with a protected amino group), benzylthioacetyl, benzylthiopropionyl, cyclopentanoyl, 2-thienylacetyl, α-cyano-2-thienylacetyl, α-amino-2-thienylacetyl (optionally with a protected amino group), 3-thienylacetyl or 2-furylacetyl group, or is a radical of the formula $C_nH_{2n+1}—C(=O)—$ or $C_nH_{2n-1}—C(=O)—$, in which $n$ is an integer within the range of from 1 to 20, preferably 1 to 7, and in which the chain may be straight or branched and, if desired, interrupted by an oxygen or a sulphur atom and/or may be substituted, for example, by halogen atoms, trifluoromethyl groups, functionally modified carboxyl, such as cyano groups, free or substituted amino groups, nitro groups or azido groups, and represents, for example, a propionyl, butyryl, hexanoyl, octanoyl, butylthioacetyl, acryl, crontonyl, 2-pentenoyl, allylthioacetyl, chloroacetyl, trifluoroacetyl, 3-chloropropionyl, 3-bromopropionyl, amino-acetyl (optionally, with a protected amino group), 2-carboxypropionyl, cyanoacetyl, 2-cyano-3-dimethylacrylyl, 5-amino-5-carboxy-valeroyl (optionally with protected carboxy and amino groups) or an azidoacetyl group.

The radical $Ac_0$ in a starting material of Formula II is primarily an acyl radical present in one of the naturally occurring or biosynthetically obtainable 6-N-acylaminopenicillanic acid or 7-N-acylamino-cephalosporanic acid compounds, that is to say, an optionally substituted arylacetyl, aryloxyacetyl, lower alkanoyl or lower alkenoyl radical, primarily the phenylacetyl or phenyloxyacetyl radical, as well as a 4-hydroxyphenylacetyl (optionally with a protected hydroxyl group), hexanoyl, octanoyl, 3-hexenoyl, 5-amino-5-carboxy-pentanoyl (optionally, with protected amino and carboxyl groups), n-butylthioacetyl or allylthioacetyl radical.

The starting materials of the Formula II used in the process of the invention may be prepared, for example, by converting an acid Compound IIIa of the formula

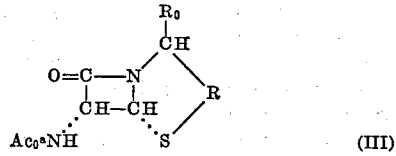

(III)

in which $Ac_0^a$ represents the acyl radical of an organic carboxylic acid, wherein free functional groups, for example, hydroxyl or mercapto groups and especially amino and carboxyl groups may be protected, and is preferably one of the above-mentioned acyl radicals present in naturally occurring 6-N-acylamino-penicillanic acid or 7-N-acylamino-cephalosphoranic acid compounds, and $R_0$ represents a carboxyl group $—C(=O)—OH$ (Compound IIIa), or a salt thereof, into the corresponding acid azide compound with the Formula III, in which $R_0$ represents the azidocarbonyl radical $—C(=O)—N_3$ (Compound IIIb), converting the latter into the corresponding isocyanato compound with the Formula III with elimination of nitrogen, in which compound $R_0$ represents the isocyanato group $—N=C=O$ (Compound IIIc), and simultaneously or subsequently treating this compound with a compound of the formula H—X (IV). If desired, the resulting compound may be converted into another compound having the Formula II, and/or, if desired, a resulting mixture of isomers may be resolved into the single isomers.

The conversion of an acid Compound IIIa or a suitable salt thereof, especially an ammonium salt, into the corresponding acid azide IIIb may be effected, for example, by conversion into a mixed anhydride (for example, by treatment with a halogenoformic acid lower alkyl ester, e.g. ethyl chloroformate, in the presence of a basic agent, such as triethylamine) and treating such anhydride with an alkali metal azide, for example, sodium azide, or an ammonium azide, for example, benzyltrimethylammonium azide. The resulting acid azide Compound IIIb can be transformed in the presence or absence of an alcohol or mercaptane compound of the Formula IV under the reaction conditions, for example, with heating, into the desired isocyanto Compound IIIc, which normally does not need to be isolated and is converted directly into the desired starting material in the presence of a compound of the Formula IV.

The reaction with a compound of the Formula IV, especially with an alcohol of the formula $R_0^a$—OH, $R_0^b$—OH, $R_0^c$—OH or $R_0^d$—OH, such as a 2 halogeno-ethanol $R_0^a$—OH, for example, 2,2,2-trichloro- or 2-bromo-ethanol, an arylcarbonylmethanol $R_0^b$—OH, for example, phenacyl alcohol, or an arylmethanol $R_0^c$—OH or $R_0^d$—OH, for example, 4,5-dimethoxy-2-nitrobenzyl alcohol or 4-methoxybenzyl alcohol, is optionally carried out in an inert solvent, for example, in a halogenated hydrocarbon, such as carbon tetrachloride, chloroform or methylene chloride, or in an aromatic solvent, such as benzene, toluene or chlorobenzene, preferably with heating.

A substituent present in the starting material may be converted into another substituent, for example, in the manner described above. If desired, protected functional groups in the radical $Rc_0^a$ may be liberated in the usual manner, for example, hydrolytically, by reduction or by treatment with an acid.

The present invention relates, in particular, to the manufacture of a penam compound of the formula

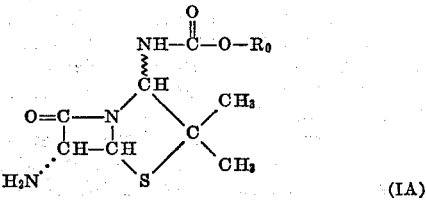

(IA)

in which $R_0$ represents the group $R_0^a$, as hereinbefore defined, especially a 2-halogeno-ethyl group, for example, the 2,2,2-trichloroethyl, 2-bromoethyl, 2,2,2-tribromoethyl or 2-iodoethyl radical, the group $R_0^b$, as hereinbefore defined, especially the phenacyl radical, the group $R_0^c$, as hereinbefore defined, especially a 2-nitrobenzyl radical, for example, the 4,5-dimethoxy-2-nitrobenzyl radical, or the group $R_0^d$, as hereinbefore defined, especially a lower alkoxy-benzyl radical, for example, the 4-methoxybenzyl radical, this compound preferably being obtained from a penam compound of the formula

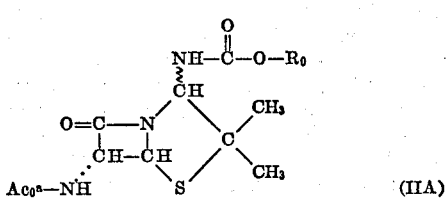

(IIA)

in which $Ac_0^a$ represents an acyl radical present in naturally occurring or biosynthetically produced N-acyl derivatives of 6-amino-penicillanic acid, especially the phenylacetyl or phenyloxyacetyl radical.

The compounds of the present invention are valuable starting materials which may be used in the preparation of pharmacologically active compounds. For example, they are primarily suitable for use in the manufacture of compounds which contain a β-lactam ring having a thio radical in the 2-position and an amino group in the 3-position, that is to say, compounds in which the five-membered or six-membered sulphur-nitrogen ring of the compound of the Formula I is split.

Accordingly, a compound of the Formula I, in which R represents an isopropylidene group and X represents a group of the formula —O—$R_0^a$ as hereinbefore defined (Compound Ia), or —O—$R_0^b$ as hereinbefore defined (Compound Ib), when treated with a chemical reducing agent, or a compound of the Formula I, in which R represents an isopropylidene group and X represents a group of the formula —O—$R_0^d$ as hereinbefore defined (Compound Id), when treated with a suitable acid, followed by reduction of the resulting 4,4-dimethyl-5-thia-2,7-diazabicyclo[4,2,0]oct-2-en-8-one formed as an intermediate product in the above cleavage reactions, for example, by treatment with a chemical reducing agent, whereby the above cleavage reactions are carried out in the presence of water, or treatment with water is carried out subsequently, is converted into the 3-isopropyl-4-thia-2,6-diazabicyclo[3,2,0]heptan-7-one of the formula

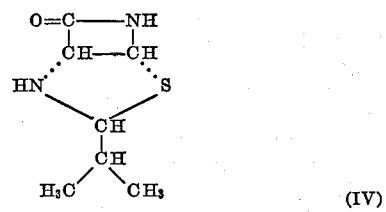

(IV)

which itself constitutes a valuable starting material.

It is thus possible to introduce into the compound of Formula IV, for example, preferably under acid conditions, an easily eliminable acyl radical $Ac_1$, for example, the acyl radical of a carbonic acid semi-ester, such as a lower alkoxy-carbonyl radical which may be branched or substituted in the lower alkyl portion, preferably in the α-position, as well as a lower alkenyloxy-carbonyl, cycloalkoxy-carbonyl, phenyloxy-carbonyl or phenyl-lower alkoxy-carbonyl radical, which may be substituted in the lower alkenyl, cycloalkyl, phenyl or phenyl-lower alkyl portion, or a lower alkoxycarbonyl radical containing a heterocyclic group with aromatic characteristics in the lower alkyl portion, preferably in the α-position, especially the tert.-butyloxycarbonyl radical.

A resulting 3-isopropyl-2-$Ac_1$-4-thia-2,6-diazabicyclo [3,2,0]heptan-7-one of the formula

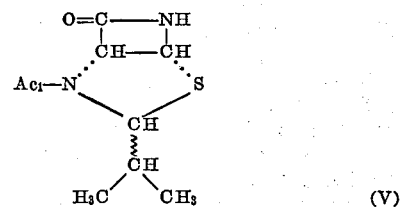

(V)

may then be reacted, usually in the absence of a condesing agent, with a suitable 3,3-diformyl-acrylic acid $R_0^a$-ester of the formula

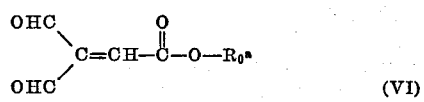

(VI)

in which $R_0^a$ has the meaning given above and primarily stands for the 2,2,2-trichloroethyl radical, and the resulting 2-(3-isopropyl-7-oxo-2-Ac$_1$-2,6-diaza-4-thia-6-bicyclo[3,2,0]heptyl-3,3-diformylpropionic acid-R$_0{}^a$-ester of the formula

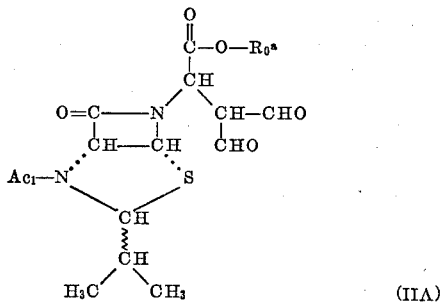

(IIA)

can be converted into a 7-amino-3-formyl-ceph(2)em-4-carboxylic acid-R$_0{}^a$-ester of the formula

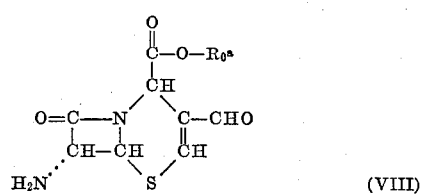

(VIII)

by treatment with an acidic agent. This compound can be converted, for example, according to the method described in Austrian patent specification No. 264,537, into 7-aminocephalosporanic acid and the N-acyl derivatives thereof.

In the above sequence of reactions, the grouping of the formula —C(=O)—O—R$_0{}^a$ or of the formula —C(=O)—O—R$_0{}^b$ in a corresponding compound of the Formula I, in which R represents the isopropylidene radical, may be split by treatment with a chemical reducing agent, the reaction usually being carried out in the presence of at least one mol, normally an excess of water. The reaction may be carried out under mild conditions, generally at room temperature or even with cooling.

As chemical reducing agents there may be used, in particular, suitable reducing metals or reducing metal compounds, for example, metal alloys or amalgams, as well as strongly reducing metal salts. Specially suitable are zinc, zinc alloys, for example, zinc-copper, or zinc amalgam, and also magnesium, which are preferably used in the presence of hydrogen donors which, together with the metals, alloys and amalgams, are capable of producing nascent hydrogen. Zinc, for example, is preferably used in the presence of acids, such as organic carboxylic acids, e.g. lower alkane-carboxylic acids, primarily acetic acid, preferably together with water, as well as in the presence of alcohols, especially aqueous alcohols, such as lower alkanols, e.g. methanol, ethanol or isopropanol, which, if necessary, can also be used together with an organic carboxylic acid. Alkali metal amalgams, for example, sodium or potassium amalgams, are preferably used in the presence of wet solvents, such as ethers or lower alkanols.

As strongly reducing metal salts there may be especially mentioned, for example, chromium-(II) salts, such as chromium-(II) chloride or chromium-(II) acetate, which are preferably used in the presence of aqueous media containing organic solvents miscible with water, for example, lower alkanols, carboxylic acids, such as lower alkane carboxylic acids, or derivatives thereof, such as optionally substituted, e.g. lower alkylated, amides or ethers. There may be used, for example, methanol, ethanol, acetic acid, dimethylformamide, tetrahydrofuran, dioxane, ethylene glycol dimethyl ether or diethylene glycol dimethyl ether.

In a corresponding compound of the Formula I, in which R represents the isopropylidene radical, and X represents a group of the formula —O—R$_0{}^c$, the grouping of the formula —C(=O)—O—R$_0{}^c$ may be split by irradiation, preferably with ultraviolet light. Light of longer or shorter wavelength is used, depending on the nature of the substituent R$_0{}^c$. For example, a group of the formula —O—R$_0{}^c$, in which R$_0{}^c$ represents an arylmethyl radical substituted in 2-position of the aryl radical by a nitro group and optionally carrying other substituents, such as, lower alkoxy groups, for example, methoxy groups, especially a benzyl radical, such as the 4,5-dimethoxy-2-nitrobenzyl radical, can be split by irradiation with ultraviolet light with a wavelength range of above 290 m$\mu$, whereas a group, in which R$_0{}^c$ represents an arylmethyl, e.g. benzyl radical that may be substituted in the 3-, 4- and/or 5-position, for example, by lower alkoxy and/or nitro groups, can be split by irradiation with ultraviolet light with a wavelength range of below 290 m$\mu$. In the first above-mentioned case, a high-pressure mercury vapor lamp is preferably used, Pyrex glass being advantageously used as a filter, with a main wavelength of 315 m$\mu$. In the second case, a low-pressure mercury vapor lamp is preferably used with a main wavelength of about 254 m$\mu$.

The irradiation reaction is preferably carried out in the presence of a suitable polar or non-polar organic solvent or a mixture thereof. As solvents there may be used, for example, an optionally halogenated hydrocarbon, such as an optionally chlorinated lower alkane, for example, benzene, as well as an alcohol, such as a lower alkanol, e.g. methanol, or a ketone, such as a lower alkanone, e.g. acetone; advantageously then contain, for example, up to 5% of water. The reaction is preferably carried out at room temperature or, if necessary, with cooling, normally in an inert gas atmosphere. If necessary, the resulting product may be worked up in the presence of water.

In a compound of the Formula I, in which R represents the isopropylidene radical and X stands for the group of the formula —O—R$_0{}^d$, the grouping of the formula

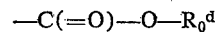

may be split by treatment with an acidic reagent, especially with an acid, for example, an optionally substituted lower alkane carboxylic acid, preferably containing one or more halogen atoms, such as acetic acid or trifluoroacetic acid, formic acid, or a suitable organic sulphonic acid, for example, para-toluenesulphonic acid. Usually an acidic reagent which is liquid under the conditions of the reaction may be used as diluent, and the operation is preferably carried out in the presence of at least an equivalent amount of water, at room temperature or with cooling, for example, at a temperature of from about —20 to about +10° C.

In the above-mentioned reactions, when, for example, in Compounds Ia the grouping of the formula

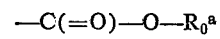

in which R$_0{}^a$ primarily stands for the 2,2,2-trichloroethyl or the 2-iodoethyl radical, or in compounds Ib the grouping of the formula —C(=O)—O—R$_0{}^b$, in which R$_0{}^b$ primarily stands for the phenacyl radical, is split, especially under controlled conditions, for example, by treatment of a Compound Ia or Ib, in which R$_0{}^a$ stands for the 2,2,2-trichloroethyl or R$_0{}^b$ stands for the phenacyl radical with a chromium-(II) compound, for example, chromium-(II) chloride, or of a Compound of Ia, in which R$_0{}^a$ stands for the 2-iodoethyl radical, with zinc in the presence of about 90% aqueous acetic acid, or in Compounds Ic the grouping —C(=O)—O—R$_0{}^c$, in which R$_0{}^c$ primarily stands for the 2-nitrobenzyl or the 3,4-dimethoxy-2-nitrobenzyl radical, is split, in particular, by irradiation with ultraviolet light without subsequent reduction, or in Compounds Id the grouping —C(=O)—O—R$_0{}^d$, in which R$_0{}^d$ primarily stands for the 4-methoxybenzyl radical, is split, in particular, by treatment with trifluoroacetic or formic acid, the 4,4-dimethyl-5-thia-2,7-diazabicyclo[4,2,0]oct-2-en-8-one of the formula

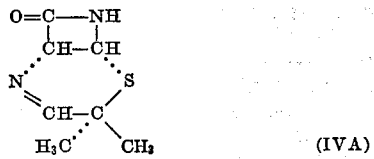
(IVA)

is formed, which may subsequently be converted into the 3 - isopropyl - 4 - thia - 2,6 - diazabicyclo[3,2,0]heptan-7-one of the Formula IV by reduction, for example, when treated with a chemical reducing agent, such as zinc in the presence of an acid, e.g. 90% acetic acid.

The introduction of an easily eliminable acyl group $Ac_1$ into the 3 - isopropyl-4-thia-2,6-diazabicyclo[3,2,0]heptan-7-one of the Formula IV can be effected in a manner known per se. The usual acylating agents may be used, preferably reactive derivatives of carbonic acid, if necessary, in the presence of a suitable condensing agent, such as a basic agent, for example, an organic tertiary base, e.g. triethylamine or pyridine. Reactive derivatives of acids are, for example, anhydrides, including mixed anhydrides, and also halides, primarily fluorides or chlorides. The acylation can also be carried out stepwise, for example, by treating the compound of the Formula IV with a carbonic acid dihalide, especially phosgene, whereupon the resulting 2-halogenocarbonyl-, e.g. 2-chlorocarbonyl-3 - isopropyl - 4 - thia - 2,6-diazabicyclo[3,2,0]heptan-7-one is reacted with an alcohol, such as an optionally branched or substituted lower alaknol, e.g. tert.-butanol.

The reaction of a compound of the Formula V with a diformyl-acrylic acid $R_a$-ester of the Formula VI may be carried out in a manner known per se, for example, by heating the reaction mixture to a temperature, at which the decomposition of the olefin compound of the Formula VI, which may also be used in hydrated form, that is to say, as the 3,3-diformyllactic acid $R_a$-ester of the formula

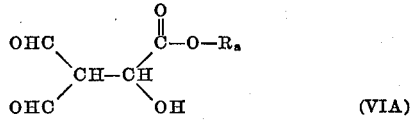
(VIA)

which loses water under the conditions of the reaction, is largely avoided, that is to say, at a temperature of from about 50° C. to about 120° C., usually in the presence of a preferably high-boiling solvent, for example, a suitable, optionally halogenated, aliphatic or aromatic hydrocarbon, such as n-octane or xylene, or a suitable ether, such as 1,2-dimethoxyethane, and/or in an inert gas atmosphere, for example, a nitrogen atmosphere, and/or under a superatmospheric pressure.

Acidic agents capable of effecting the opening of the five-membered ring and closure to form the six-membered sulphur-nitrogen ring in compounds of the Formula VII are primarily inoragnic or strong organic, oxygen-containing acids, as well as aprotic Lewis acids of the boron trifluoride type and complexes thereof. As inorganic oxygen-containing acids there may be used, for example, sulphuric acid, phosphoric acid or perchloric acid. Strong organic oxygen-containing acid are, for example, strong organic carboxylic acids, such as substituted lower alkanecarboxylic acids, especially trifluoroacetic acid, or strong organic sulphonic acids, e.g. para-toluene-sulphonic acid. As aprotic Lewis acids of the boron trifluoride type there may be used, for example, boron trifluoride itself, or a complex thereof, for example, with ether, i.e. boron trifluoride etherate, or with hydrofluoric acid, i.e. hydrofluoroboric acid, as well as tin tetrachloride. It is also possible to use suitable mixtures of acids.

The above ring-cleavage and ring-closure reaction may be carried out either in the presence or in the absence of a suitable solvent (whereby certain acidic agents, such as trifluoroacetic acid, may simultaneously serve as solvents), while cooling, at room temperature or while heating, if necessary, in a nitrogen atmosphere and/or in a closed vessel.

At the same time, an acyl group $Ac_1$, capable of being split off easily under acidic conditions, for example, a tert.-butyloxycarbonyl radical, may be split off under the conditions of the reaction.

The compounds of the Formula I may be converted as follows into other compounds which can themselves be used as starting materials or which may be used as such by virtue of their pharmacological action:

By introducing into the free amino group of a compound of the Formula I, primarily one that can be obtained from compounds of the Formula II, in which R represents the isopropylidene radical, an acyl radical Ac which is different from the split-off acyl radical $Ac_0$ and which preferably contains protected functional groups, e.g. hydroxyl, mercapto, amino and/or carboxy groups, for example, an acyl radical $Ac_1$ which in particular can be split off easily under acidic conditions, or an acyl radical $Ac_2$ optionally containing protected functional groups, which acyl group is present in pharmacologically active, especially highly active 6 - N - acylamino - penicillanic acid or 7 - N - acylamino - cephalosporanic acid compounds, such as the phenyl-glycyl radical, in which the amino group may be protected, for example, by an easily eliminable acyl group, such as the 2,2,2-trichloroethoxy carbonyl or tert.-butyloxy carbonyl group, by an acylation process known per se and subsequently treating the resulting 6-N-acrylamino-2,2-dimethyl-3-N-[$X_0$—C(=O)]-amino-penam compound of the formula

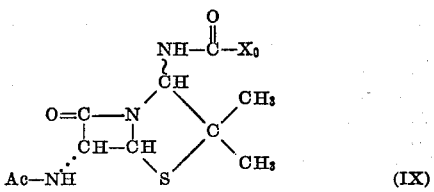
(IX)

in which Ac represents the radical $Ac_1$ or $Ac_2$, which is stable under the reducing conditions, and the group $X_0$ is a group of the formula —O—$R_0^a$ or —O—$R_0^b$, with a chemical reducing agent, with simultaneous or subsequent treatment with water, or irradiating a resulting compound of the Formula IX, in which Ac represents a radical $Ac_1$ or $Ac_2$ which is stable under irradiation, and the group $X_0$ represents a group of the formula —O—$R_0^c$, with ultraviolet light, with simultaneous or subsequent treatment with water, there is obtained a 6-N-acylamino-3-hydroxy-2,2-dimethyl-penam compound of the formula

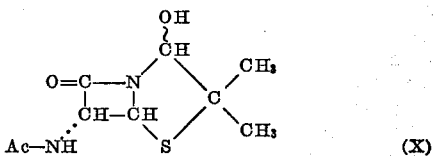
(X)

in which, if desired, the free hydroxyl group may be esterified, and/or protected functional groups liberated, and/or, if desired, resulting isomer mixtures can be resolved into the single isomers.

Acylation of a compound of the Formula I may be carried out in a manner known per se. The usual acylating agents or reactive derivatives thereof may be used, for example, an acid in the presence of a suitable condensing agent, such as a carbodiimide, e.g. dicyclohexylcarbodiimide, or an acid derivative, if necessary, in the presence of a basic agent, such as an organic tertiary base, e.g. triethylamine or pyridine. As a reactive derivative of an acid there may be used, for example, an anhydride, including a mixed anhydride, especially an anhydride obtainable with a halogeno-formic acid ester, such as ethyl chloroformate, a halide, primarily a fluoride or chloride, or a reactive ester, for example, an ester of an acid with an alcohol or phenol containing electron-attracting groups, as well as with an N-hydroxy compound, for example, cyanomethanol, paranitrophenol or N-hydroxysuccinimide. As stated above, acylation can also be carried out stepwise.

The treatment of a compound of the Formula IX, in which the group $X_0$ is a residue of the formula $-O-R_0^a$ or $-O-R_0^b$, with a chemical reducing agent, or the irradiation of a compound of the Formula IX, in which the group $X_0$ is a residue of the formula $-O-R_0^c$, with ultraviolet light, may be carried out, for example, according to the processes described above.

If desired, the hydroxyl group in the 2-position in the resulting compound may be acylated in a manner known per se, for example, by one of the methods described above.

Any protected functional groups in a resulting compound can be liberated in a manner known per se. For example, a suitable acyl radical, such as a lower alkoxycarbonyl radical that can be split under acidic conditions, for example, the tert.-butyloxycarbonyl radical, as well as the tert.-pentyloxycarbonyl, adamantyloxycarbonyl or diphenylmethoxycarbonyl radical, or a 2-halogeno-lower alkoxycarbonyl radical that can be split by reduction, for example, the 2,2,2-trichloroethoxycarbonyl radical, may be split off, the former, for example, by treatment with trifluoroacetic acid, and the latter by treatment with a chemical reducing agent, especially with zinc in the presence of aqueous acetic acid.

A compound of the Formula X can be used as a starting material in the preparation of other products that are either pharmacologically active or which can be used as intermediate products.

For example, they can be converted into 1-formyl-2α-(2-acyloxy - 2 - propylmercapto) - 3α - N-acylaminoazetidin-4-one compounds of the formula

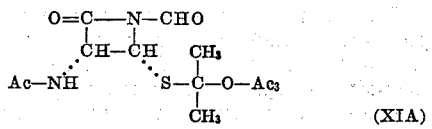

(XIA)

in which $Ac_3$ represents the acyl radical of an organic carboxylic acid, especially a lower alkanoyl radical, e.g. the acetyl radical.

The compounds of the Formula XIA, especially those in which Ac represents an acyl radical $Ac_2$, display valuable pharmacological properties; in particular, they are especially effective against Gram-positive bacteria, for example, Staphylococcus aureus, for example, when used in dilutions of up to 0.01%. They are, therefore, useful as anti-bacterial substances. Furthermore, compounds of the Formula XIA, in which Ac is, in particular, an acyl radical $Ac_1$, but may also represent an acyl radical $Ac_2$, can also be used as intermediate products in the manufacture of valuable compounds having, for example, pharmacological activity.

A compound of the Formula XIA may be obtained by treating a compound of the Formula X, in which any free functional group present in the acyl radical Ac is temporarily protected, for example, by functional modification, with an oxidizing agent yielding an acyloxy group of the formula $-O-Ac_3$, and, if desired, protected functional groups in the Ac radical may be liberated and/or, if desired, a resulting isomer mixture may be resolved into the single isomers.

Oxidizing agents yielding acyloxy groups of the formula $-O-Ac_3$ are preferably oxidizing heavy-metal carboxylates, particularly lead-(IV) carboxylates, for example, lead-(IV) alkanoates, especially lower alkanoates, primarily lead tetraacetate, lead tetrapropionate or lead tetrastearate, as well as optionally substituted lead tetrabenzoates, for example, lead tetrabenzoate or lead tetra-3-bromobenzoate, and thallium-(III) carboxylates, for example, thallium-(III) acetate, or mercury-(II) carboxylates, such as mercury-(II) acetate. If desired, these oxidizing agents can be formed in situ, for example, by reacting lead dioxide or mercury-(II) oxide with an organic carboxylic acid, such as acetic acid. At least an equivalent amount of oxidizing agent may be used; normally an excess amount is employed.

It is advantageous to use the above-mentioned heavy-metal carboxylates, especially the corresponding lead-(IV) compounds, in the presence of a light source, it being preferable to work with ultraviolet light, as well as light of longer wavelengths, for example, visible light, if necessary, with the addition of suitable sensitizers. The main wavelength range of the ultraviolet light is preferably above 280 mμ, primarily at about 300 mμ to about 350 mμ; this can be achieved, for example, by appropriate filtration of the ultraviolet light through a suitable filter, for example, a glass filter, or through suitable solutions, for example, salt solutions, or other liquids capable of absorbing light of shorter wavelengths, such as benzene or toluene. The ultraviolet light is preferably produced by means of a high-pressure mercury vapor lamp.

The above reaction may be carried out, for example, by treating the starting material of the Formula X with the requisite amount of an oxidizing agent capable of yielding an acyl group of the formula $-O-Ac_3$, usually in the presence of a suitable diluent, for example, benzene, acetonitrile or acetic acid, if necessary, with cooling or with heating and/or in an inert atmosphere, while irradiating with ultraviolet light.

Protected functional groups, for example, as specified above, present in a resulting compound may be liberated in a manner known per se.

Furthermore, a compound of the Formula X can also be used for the manufacture of 2α-(2-hydroxymethyl-2-propylmercapto)-3α - N - acylaminoazetidin-4-one compounds of the formula

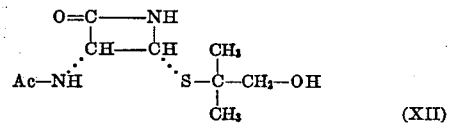

(XII)

as well as O-esters thereof with organic carboxylic acids, as well as with carbonic acid semi-derivatives.

Compounds of this kind, in which Ac represents, in particular, the acyl radical $Ac_1$, as well as the acyl radical $Ac_2$, are valuable intermediate products.

They may be obtained by treating compounds of the Formula X with a hydride reducing agent which is inert towards amide groupings, and, if desired, the hydroxyl group in the resulting compounds may be esterified, and/or, if desired, any protected functional groups present in an acyl radical in resulting compounds may be liberated, and/or, if desired, an isomer mixture obtained may be resolved into the single isomers.

Hydride reducing agents which do not reduce an amide grouping, are primarily hydrides containing boron, for example, diborane, and especially alkali metal or alkaline earth metal boron hydrides, particularly sodium boron hydride. Complex organic aluminium hydrides, for example, alkali metal tri-lower alkoxy-aluminium hydrides, e.g. lithium tri-tert.-butyloxy-aluminium hydride, may also be used.

The reducing agent is preferably used in the presence of a suitable solvent or a mixture thereof. An alkali metal boron hydride, for example, is preferably used in the presence of a solvent containing one or more hydroxyl or ether groupings, for example, a lower alkanol, e.g. methanol or ethanol, as well as isopropanol, tetrahydrofuran or diethylene glycol dimethyl ether, if necessary, with cooling or heating.

The free hydroxyl group present in a resulting compound may be esterified, for example, according to the process described above. Any protected functional groups may be liberated in a manner known per se, for example, in the manner described above.

As already stated, the compounds of the Formula XII may be used as intermediate products. For example, they can be converted, inter alia, into compounds of the formula

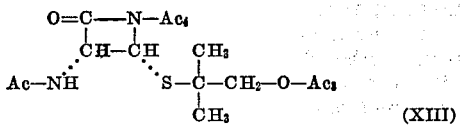

(XIII)

in which Ac represents, in particular, an acyl radical $Ac_2$ and each of the groups $Ac_3$ and $Ac_4$ represents the acyl radical of an organic carboxylic acid. These compounds are effective against Gram-positive bacteria, especially *Staphylococcus aureus*, and are useful as anti-bacterial compounds.

They may be obtained by acylating a compound of the Formula XII, in which free functional groups present in an acyl radical Ac may be protected, or O—$Ac_3$ compounds thereof, at an elevated temperature. Acylating agents used are organic carboxylic acid, but primarily reactive functional derivatives thereof, as described above, especially anhydrides or halides, for example, chlorides, and the reaction is preferably carried out at a temperature of from about 40° C. to about 150° C., especially of from about 60° C. to about 120° C., and, if necessary, in the presence of a condensing agent suitable for acylation purposes. There may be used, for example, a free carboxylic acid in the presence of a carbodiimide, e.g. dicyclohexylcarbodiimide, or a reactive functional derivative of an organic carboxylic acid in the presence of an organic, especially a tertiary base, for example, pyridine.

Furthermore, a compound of the Formula XII, in which any free functional group present in an acyl radical Ac, which is, in particular, an acyl radical $Ac_1$ or $Ac_2$, is temporarily protected, or an O-ester thereof with an organic carboxylic acid or with a carbonic acid semi-derivative, may be converted by treatment with an oxidizing agent capable of yielding an acyloxy group of the formula —O—$Ac_3$ and, if desired, after liberation of functional groups, if any, in the acyl radical Ac, into a compound of the formula

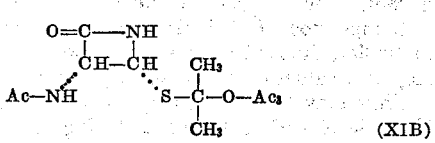

(XIB)

Compounds of this type, in which Ac primarily stands for an acyl radical $Ac_2$, are, like the compounds of the Formula XIA, effective against Gram-positive bacteria, such as *Staphylococcus aureus*, for example, when used in dilutions of up to 0.01%; they are, therefore, useful as antibacterially active substances. Furthermore, a compound, in which Ac represents an acyl radical $Ac_1$, or an acyl radical $Ac_2$, is particularly suitable for use as an intermediate compound in the preparation of other valuable compounds which, for example, are pharmacologically active or that can be used as intermediates themselves.

In the manufacture of a compound of the Formula XIB from a compound of the Formula XII, the oxidizing agents yielding acyloxy groups primarily used are the above-mentioned oxidizing heavy-metal carboxylates, especially lead-(IV) alkanoates, preferably lead tetraacetate, the amount of oxidizing agent used being, as specified, at least the equivalent quantity, but generally an excess, and the reaction being advantageously carried out in the presence of a light source, primarily ultraviolet light, and a suitable solvent or diluent.

As stated, compounds of the Formulae XIA and XIB are suitable for use in the manufacture of pharmacologically active compounds or as intermediate compounds, especially in the manufacture of 1-$R_1$-2α-isopropenylmer-capto-3α-N-Ac-aminoazetidin-4-one compounds of the formula

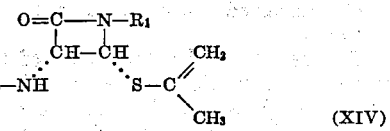

(XIV)

in which $R_1$ represents a hydrogen atom or a formyl group.

Compounds of the Formula XIV have valuable pharmacological properties. For example, they are effective against Gram-positive bacteria, such as, *Staphylococcus aureus*. Especially useful are those, in which Ac represents an acyl radical $Ac_2$, when used, for example, in dilutions of up to 0.01%; they are, therefore, useful as antibacterial substances. They are mainly used as intermediates for the manufacture of valuable, such as pharmacologically active, compounds, those of the Formula XIV being especially valuable, in which Ac represents an acyl radical $Ac_1$.

The compounds of the Formula XIV may be obtained by thermally decomposing compounds of the formula

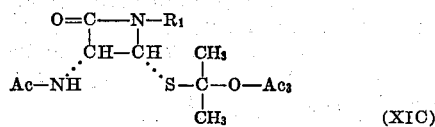

(XIC)

in which $R_1$ represents a hydrogen atom or a formyl group, and, if desired, subsequently splitting off a formyl group $R_1$ in a resulting compound, and/or, if desired, liberating in a resulting compound protected functional groups present in an acyl radical, and/or, if desired, resolving a resulting isomer mixture into the single isomers.

The thermal decomposition of the starting material is preferably carried out in the presence of an inert solvent or solvent mixture, especially a suitable hydrocarbon, for example, an aliphatic or aromatic hydrocarbon, such as a high-boiling petroleum ether, benzene, toluene or xylene, at a temperature within the range of from about 50° C. to about 150° C., preferably of from about 70° C. to about 120° C. If desired, the process can be carried out in an inert gas atmosphere, for example, a nitrogen atmosphere.

In a resulting compound of the Formula XIV, in which $R_1$ represents the formyl radical, said radical can be replaced by a hydrogen atom, for example, by hydrolysis, alcoholysis, ammonolysis or aminolysis, as well as by treatment with a decarbonylating agent. Hydrolysis can be carried out, for example, by treatment with a suitable inorganic base, such as an alkali metal or alkaline earth metal hydroxide or carbonate, e.g. sodium, potassium, calcium or barium hydroxide or carbonate, as well as an alkali metal hydrogen carbonate, e.g. sodium or potassium hydrogen carbonate, in an aqueous medium. Alcoholysis with an alcohol, such as a lower alkanol, e.g. methanol or ethanol, or a mercaptan, is preferably carried out in the presence of the corresponding alcoholate or thiolate, for example, an alkali metal lower alkanolate, e.g. sodium methylate or ethylate, or in the presence of a weakly basic acylate, such as an alkali metal lower alkanoate, e.g. sodium acetate.

Ammonolysis with ammonia, and also with quaternary ammonium hydroxides, e.g. benzyltrimethylammonium hydroxide or tetrabutylammonium hydroxide, likewise leads to removal of a formyl group $R_1$. When using ammonia, the process is performed, for example, in a two-phase system. The ammonia, which is preferably used in the form of an aqueous solution, is introduced in a weak concentration into the organic phase and splits off the formyl group. Aminolysis can be carried out with an amine, especially a primary or secondary, primarily aliphatic or aromatic amine, e.g. ethylamine, diethylamine, pyrrolidine or aniline.

As a decarbonylating agent there may be used, for example, a complex transition metal compound capable of forming a stable complex with carbon monoxide, such as a trisubstituted tris-phosphine-rhodium halide, e.g. tris-triphenyl phosphine)-rhodium chloride. The reaction is preferably carried out in a suitable inert solvent, such as benzene, or a mixture of solvents; if desired, the process is carried out in an inert atmosphere, for example, a nitrogen atmosphere.

The removal of the formyl group, which is preferably carried out at an elevated temperature, for example, when using a decarbonylating agent, can also be carried out directly on a compound of the Formula XIA. Under these conditions, thermal decomposition with formation of the isopropenyl group replacement of the formyl group by hydrogen occurs simultaneously.

Compounds, that can be prepared by using those of the Formula XIV as starting materials, are, for example, compounds of the formula

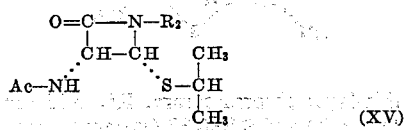

(XV)

in which $R_2$ represents a hydrogen atom or the acyl radical $Ac_4$ of an organic carboxylic acid or the acyl radical of a carbonic acid semi-derivative.

Compounds of the above kind, especially those in which $R_2$ represents an acyl group $Ac_4$, and in which Ac represents an acyl radical $Ac_2$, possess valuable pharmacological properties. In particular, when used in dilutions of up to 0.01%, they are effective against Gram-positive bacteria, such as *Staphylococcus aureus*.

They may be obtained by saturating the isopropenyl group in compounds of the Formula XIV and, if desired, acylating the hydrogen-containing nitrogen atom of the lactam grouping in a resulting compound, and/or, if desired, liberating in a resulting compound protected functional groups present in an acyl radical, and/or, if desired, resolving a resulting isomer mixture into the single isomers.

The reduction of the isopropenyl radical in the starting material of the Formula XIV is preferably carried out by treatment with catalytically activated hydrogen, for example, with hydrogen in the presence of a noble metal catalyst containing e.g. palladium or platinum, if necessary, under superatmospheric pressure and/or with heating.

A formyl group $R_1$ can be replaced by a hydrogen atom, and the latter, if necessary, by an acyl radical, for example, according to one of the methods described above, and, if desired, protected functional groups present in a resulting compound may be liberated in a manner known per se, for example, in the manner described above.

A compound of the Formula XIV, in which Ac represents an acyl radical $Ac_1$ capable of being easily split off, especially under acid conditions, and $R_2$ represents a hydrogen atom, can also be transformed into a compound of the formula

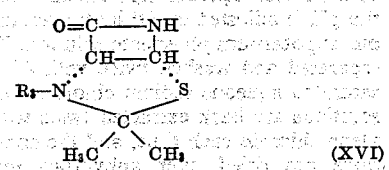

(XVI)

in which $R_3$ represents a hydrogen atom or an acyl group, especially an acyl group $Ac_1$. Compounds of this type are valuable intermediate products which may be used in the synthesis of 7-acylamino-cephalosporanic acid compounds (cf. for example, Austrian patent specifications 263,768 and 264,537).

They may be obtained by treating compounds of the Formula XIV, in which Ac preferably represents one of the above-mentioned radicals $Ac_1$ which can be split off easily, especially the tert.-butyloxycarbonyl radical, and $R_1$ represents a hydrogen atom, with a strong oxygen-containing acid, and, if desired, acylating the unsubstituted nitrogen atom in the 3-position present in a resulting compound of the Formula XVI.

The ring closure may be effected by treatment with a strong oxygen-containing inorganic or organic acid, for example, an organic carboxylic or a sulphonic acid, especially a lower alkane carboxylic acid optionally substituted by hetero groups, preferably halogen atoms, for example, an α-halogeno-acetic acid or α-halogeno-propionic acid, in which the halogen atom is preferably a fluorine or chlorine atom, especially trifluoroacetic acid. The reaction may be carried out in the absence or presence of an inert solvent, for example, dioxan, or a mixture of solvents, if necessary, with cooling, for example, at a temperature of from about −30° C. to about +10° C., and/or in an inert gas atmosphere, for example a nitrogen atmosphere.

Acylation of an unsubstituted ring nitrogen atom in a compound of the Formula XVI can be carried out, for example, in the manner described above, if desired, in steps.

The following examples illustrate the invention; temperatures are given in degrees centigrade.

EXAMPLE 1

A total of 166 ml. of a 10% solution of phosphorus pentachloride in methylene chloride is added at −10° in a nitrogen atmosphere to a solution of 11.0 g. of 2,2-dimethyl-6-(N-phenyl-acetyl-amino) - 3 - (N-2,2,2-trichloroethyloxycarbonyl-amino)-penam in a mixture of 240 ml. of anhydrous methylene chloride and 25.6 ml. of pyridine; the reaction mixture is stirred for 30 minutes at 0°. A total of 120 ml. of absolute methanol is added while cooling (−10°); the reaction mixture is stirred for a further 2 hours and treated with 80 ml. of water. The pH value (measured in samples diluted with water) is adjusted to 3.3 with about 9 ml. of a 2 N aqueous sodium hydroxide solution and the mixture is allowed to react during one hour at 0° and during one hour at 20°. The mixture is then poured into 500 ml. of a 1-molar aqueous dipotassium hydrogen phosphate buffer solution, while stirring, and the pH is adjusted from 6.5 to 7.0 by the addition of a 50% aqueous tripotassium phosphate solution. The aqueous phase is separated and washed twice with 200 ml. of methylene chloride each time; the three organic solutions are each washed twice with water, combined, dried over sodium sulphate and evaporated under reduced pressure. The crystalline residue is dissolved in 40 ml. of a 1:1-mixture of benzene and hexane, the mixture is cooled for 15 minutes at 0° and the precipitate is removed by filtration. In this manner, the 6-amino-2,2-dimethyl-3-(N-2,2,2-trichloroethyloxycarbonyl-amino)-penam of the formula

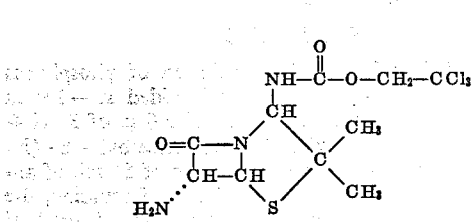

is obtained, M.P. 179–180° (corrected); infrared absorption spectrum; characteristic bands in methylene chloride at 2.90μ, 5.58μ, 5.72μ, 6.62μ, 7.17μ, 7.27μ, 8.32μ, 8.46μ, 8.82μ, 9.25μ and 9.62μ and in mineral oil at 2.95μ, 3.01μ, 3.11μ, 5.64μ, 5.80μ, 6.35μ, 7.60μ, 7.87μ, 8.00μ, 8.27μ, 8.65μ, 8.70μ, 9.16μ and 9.57μ; thin-layer chromatogram (silica gel): Rf=0.17 (system toluene/acetone 8:2) and Rf=0.43 (system toluene/acetone 6:4) (characteristic yellow coloration with Ninhydrin-collidine: free amino group).

The starting material can be prepared as follows: A total of 9 ml. of trichloroacetyl chloride is added at −15° in a nitrogen atmosphere to a suspension of 30 g. of the potassium salt of 2,2-dimethyl-6-(N-phenylacetyl-amino)-penam-3-carboxylic acid in a mixture of 150 ml. of anhydrous dimethyl formamide and 12 ml. of pyridine and the mixture is stirred for 15 minutes at −15°. A total of 6.5 g. of solid sodium azide is added to the clear yellow solution, which is then stirred for a further 15 minutes at −15°. The mixture is then poured into a mixture of 400 ml. of toluene and 400 ml. of ice-water while stirring. The phases are separated; the aqueous solution is twice extracted in the cold with 250 ml. of toluene each time. The three organic solutions are washed twice with 250 ml. of ice-water each time, combined, dried over sodium sulphate and evaporated under reduced pressure. The residue contains the 2,2-dimethyl - 6 - (N-phenylacetyl-amino)-penam-3-carboxylic acid azide; infrared absorption spectrum (in methylene chloride): characteristic bands at 3.02μ, 4.69μ, 5.60μ, 5.93μ, 6.70μ and 8.54μ; thin-layer chromatogram (silica gel): Rf=0.49 (system toluene/acetone 8:2), and Rf=0.69 (system toluene/acetone 6:4); it still contains solvent and is converted into the 3-isocyanato - 2,2 - dimethyl - 6 - (N-phenylacetyl-amino)-penam on further drying.

A total of 24.3 g. of the 2,2-dimethyl-6-(N-phenylacetyl-amino)-penam-3-carboxylic acid azide obtained as the evaporation residue is dried for 24 hours at 20° in a high vacuum. The 3-isocyanato-2,2-dimethyl-6-(N-phenylacetyl-amino)-penam is obtained in the form of a light brown foam; infrared absorption spectrum (in methylene chloride): characteristic bands at 3.00μ, 4.44μ, 5.59μ, 5.93μ, 6.69μ, 7.98μ and 8.35μ; thin-layer chromatogram (silica gel): Rf=0.23 (system toluene/acetone 8:2), and Rf=0.52 (system toluene/acetone 6:4). The 3-isocyanato-2,2-dimethyl-6-(N-phenylacetyl-amino) - penam is also obtained by heating a benzene solution of the 2,2-dimethyl-6-(N-phenylacetylamino)-penam-3-carboxylic acid azide for half an hour at 70° in a nitrogen atmosphere.

A total of 14.1 ml. of 2,2,2-trichloroethanol is added to a solution of 19.3 g. of 3-isocyanato-2,2-dimethyl-6-(N-phenylacetyl-amino)-penam in 200 ml. of benzene; the exothermic reaction is initiated by the addition of 0.9 ml. of triethylamine and the temperature is kept at 20° by cooling. The mixture is allowed to stand for 1 hour at 20° and for 1 hour at 0°; the precipitate is isolated by filtration and washed with 50 ml. of a cold 1:1-mixture of benzene and hexane and with hexane (room temperature). The resulting 2,2 - dimethyl-6-(N-phenylacetyl-amino)-3-(N-2,2,2-trichloroethyloxycarbonyl-amino) - penam melts at 200–202° (corrected); thin-layer chromatogram (silica gel): Rf=0.35 (system toluene/acetate 8:2) and Rf=0.66 (system toluene/acetone 6:4).

EXAMPLE 2

A total of 46 ml. of a 10% solution of phosphorus pentachloride in methylene chloride is added at −10° in a nitrogen atmosphere to a solution of 3.0 g. of 3-(N-4-methoxybenzyloxycarbonyl-amino)-2,2-dimethyl - 6 - (N-phenylacetyl-amino)-penam in a mixture of 65 ml. of anhydrous methylene chloride and 7.1 ml. of pyridine; the mixture is then stirred for 30 minutes at 0°. A total of 33 ml. of absolute methanol is added with cooling (−10°) and the mixture is stirred for a further two hours. A total of 22 ml. of water is added, the pH value (measured with samples diluted with water) is adjusted to 3.3 with about 2 ml. of a 2 N aqueous sodium hydroxide solution and the mixture is allowed to react for 30 minutes at 0° and for one hour at 20°, then poured onto 140 ml. of a 1-molar aqueous dipotassium hydrogen phosphate buffer solution. The pH is adjusted to 7.0 by the addition of 10.7 ml. of a 50% aqueous tripotassium phosphate solution. The aqueous phase is separated and washed three times with 140 ml. of methylene chloride each time; the four organic solutions are each washed twice with 200 ml. of water each time, combined, dried over sodium sulphate and evaporated under reduced pressure. The amorphous residue is digested with hexane; the portion insoluble in hexane contains the 6-amino-3-(N-4-methoxybenzyloxycarbonyl-amino)-2,2-dimethyl - penam of the formula

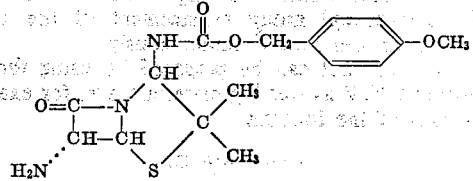

thin-layer chromatogram: Rf=0.13 (system toluene/acetone 8:2) and Rf=0.32 (system toluene/acetone 6:4); infra-red absorption spectrum (in methylene chloride): characteristic bands at 3.00μ, 5.62μ, 6.21μ, 6.70μ, 8.54μ and 9.65μ.

The starting material can be obtained as follows:
A total of 3.73 g. of 4-methoxybenzyl alcohol and 0.2 ml. of triethylamine are added to a solution of 4.61 g. of crude 3-isocyanato-2,2-dimethyl - 6 - (N - phenylacetyl-amino)-penam in 50 ml. of benzene; the mixture is allowed to stand for 3 hours, then evaporated under reduced pressure. The residue is chromatographed on 250 g. of silica gel; the fractions eluted with a 9:1-mixture of toluene and acetone contain the amorphous 3-(N-4-methoxy-benzyloxycarbonyl-amino)-2,2-dimethyl - 6 - (N - phenylacetyl-amino)-penam, which in the thin-layer chromatogram (silica gel) has an Rf value of 0.27 (system toluene/acetone 8:2) and an Rf value of 0.59 (system toluene/acetone 6:4); infra-red absorption spectrum (in methylene chloride): characteristic bands at 2.88μ, 5.56μ, 5.76μ, 5.91μ, 6.16μ, 6.64μ, 8.48μ and 9.67μ.

EXAMPLE 3

A solution of 5.03 g. of 3-(N-2-iodoethyloxycarbonyl-amino)-2,2-dimethyl-6-(N-phenylacetyl - amino) - penam in 105 ml. of absolute methylene chloride and 11 ml. of absolute pyridine is cooled to about −10° in a nitrogen atmosphere and then treated with 91 ml. of an 8% solution of phosphorus pentachloride in absolute methylene chloride. The reaction mixture is stirred for 30 minutes at 0°, again cooled to −10° and treated with 50 ml. of absolute methanol. After 105 minutes at 0°, 36 ml. of water are added to the reaction mixture, the pH of the two-phase system is adjusted to 3.3 with about 12 ml. of a 2 N aqueous sodium hydroxide solution; stirring is continued for 30 minutes at 0° and for 45 minutes at room temperature. The reaction mixture is poured into 120 ml. of a 1-molar aqueous dipotassium phosphate solution and the pH is adjusted to 7.0 by the addition of a 50% aqueous tripotassium phosphate solution. The organic phase is separated and washed twice with 40 ml. each time of a saturated aqueous sodium chloride solution. The aqueous solutions are back extracted twice with 100 ml. of methylene chloride each time, and the combined organic solutions are dried over anhydrous magnesium sulphate, evaporated under reduced pressure and mild conditions (low temperature) and the residue is dried for a short period under reduced pressure.

The amorphous, honey-colored residue in methylene chloride is chromatographed on 100 g. of silica gel (column), nonpolar by-products being washed out with methylene chloride and methylene chloride, containing 3% of methyl acetate. The 6-amino-3-(N - 2 - iodoethyloxycarbonyl-amino)-2,2-dimethyl-penam of the formula

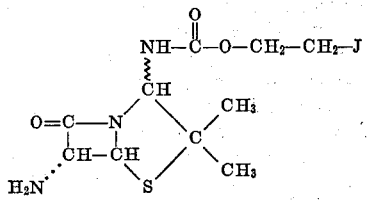

is eluted with methylene chloride, containing 5 to 20% of methyl acetate and, after repeated chromatography, melts at 131–134°; $[\alpha]_D^{20} = +86°\pm1°$ (c.=0.974 in chloroform); thin-layer chromatogram: $Rf=0.18$ (system toluene/ethyl acetate 1:1), $Rf=0.30$ (system chloroform/acetone 4:1) and $Rf=0.58$ (system toluene/acetone 1:1); infra-red absorption spectrum: characteristic bands in methylene chloride at 2.90μ, 5.60μ, 5.77μ, 6.18μ, 6.64μ, 6.85μ, 8.17μ, 8.34μ, 8.47μ, 9.25μ, 9.37μ and 9.66μ and in mineral oil at 2.98μ, 5.71μ, 5.79μ, 6.50μ, 7.61μ, 8.04μ, 8.39μ, 9.18μ, 9.72μ, 10.65μ and 11.54μ.

The starting material can be prepared in the following manner:

A total of 4.9 ml. of 2-bromoethanol and 0.1 ml. of bis-tri-n-butyl tin oxide are added to the yellow solution of 23 g. of crude 3-isocyanato-2,2-dimethyl-6-(N-phenylacetyl-amino)-penam in 230 ml. of benzene, prepared by heating 2,2 - dimethyl-6-(N-phenylacetyl-amino)-penam-3-carboxylic acid azide; the mixture is allowed to stand for 2 hours at room temperature and is then evaporated. The residue is taken up in methylene chloride and chromatographed on 350 g. of silica gel (column). The 3-(N-2-bromoethoxycarbonyl-amino) - 2,2 - dimethyl-6-(N-phenylacetyl-amino)-penam is eluted with a 9:1-mixture of methylene chloride and ethyl acetate. After recrystallization from a mixture of methylene chloride and cyclohexane or acetone and cyclohexane, the product melts at 149–150°; $[\alpha]_D^{20} = +99°\pm1°$ (c.=1.008 in chloroform); thin-layer chromatogram (silica gel): $Rf=0.51$ (system toluene/ethyl acetate 1:1), $Rf=0.32$ (system toluene/acetone 4:1) and $Rf=0.71$ (system toluene/acetone 1:1); ultraviolet absorption spectrum (in ethanol): $\lambda_{max.}$ 252 mμ (ε=300), 258 mμ (ε=270) and 265 mμ (ε=180); infra-red absorption spectrum: characteristic bands at 2.91μ, 5.58μ, 5.77μ, 5.94μ, 6.62μ (shoulder) 6.66μ, 8.21μ, 8.30μ, 8.48μ, 9.32μ and 9.64μ (in methylene chloride) and at 2.93μ, 2.95μ, 3.01μ, 5.62μ, 5.79μ, 5.82μ (shoulder) 5.91μ, 5.98μ, 6.53μ, 6.57μ, 6.68μ and 7.36μ (in mineral oil).

A solution of 6.9 g. of sodium iodide in 34.5 ml. of purified acetone is poured over 5.265 g. of 3-(N-2-bromoethyloxycarbonyl-amino)-2,2-dimethyl - 6 - (N-phenylacetyl-amino)-penam and the mixture is allowed to stand for 16 hours at 30°; a dense precipitate of sodium bromide starts to form after a few minutes. After the reaction, the solvent is removed by evaporation under reduced pressure and the residue is taken up in 30 ml. of water and 70 ml. of ethyl acetate. After the addition of a few drops of a 0.1 N aqueous sodium thiosulphate solution, the golden-yellow organic phase is shaken; the aqueous phase is separated and washed twice with 50 ml. of ethyl acetate each time. The combined organic solutions are washed twice with 20 ml. of water each time, dried over magnesium sulphate and concentrated to a volume of 20–30 ml. The mixture is diluted with 50 ml. of methylene chloride, 200 ml. of hot cyclohexane are added, and the mixture is cooled to room temperature and then allowed to stand for one hour at 4°. The colorless needles are isolated by filtration and washed with a 4:1-mixture of cyclohexane and ether. The resulting 3-(N-2-iodoethyloxycarbonyl-amino)-2,2-dimethyl - 6 - (N-phenylacetyl-amino)-penam melts at 153–154° after recrystallization from methyl acetate and cyclohexane; $[\alpha]_D^{20} = +89°\pm1°$ (c.=1.011 in chloroform); thin-layer chromatogram (silica gel): $Rf=0.56$ (system toluene/ethyl acetate 1:1), $Rf=0.35$ (system toluene/acetone 4:1) and $Rf=0.74$ (system toluene/acetone 1:1); ultraviolet absorption spectrum (in ethanol): $\lambda_{max.}$ 252 mμ (ε=815), 258 mμ (ε=775), 264 mμ (ε=600) and 335 mμ (ε=45); infra-red absorption spectrum: characteristic bands at 2.90μ, 5.58μ, 5.76μ, 5.93μ, 6.65μ, 6.85μ, 8.18μ, 8.34μ, 8.47μ and 9.37μ (in methylene chloride) and at 2.97μ (shoulder), 3.03μ, 5.62μ, 5.87μ, 6.58μ, 6.59μ, 6.67μ, 7.65μ, 8.01μ, 9.67μ and 13.92μ (in mineral oil)

EXAMPLE 4

A solution of 4.97 g. of 2,2-dimethyl-6-(N-phenyloxyacetyl-amino) - 3 - (N-2,2,2-trichloroethyloxycarbonyl-amino)-penam in 100 ml. of absolute methylene chloride and 11 ml. of absolute pyridine is cooled to about −10° in a nitrogen atmosphere and then 91 ml. of an 8% phosphorus pentachloride solution in absolute methylene chloride are added. The reaction mixture is stirred for 30 minutes at 0°, cooled again to −20° and then 50 ml. of absolute methanol are added. The pale yellow solution is allowed to stand for 2 hours at 0° and then diluted with 36 ml. of water. The pH value is adjusted from 1.9 to 3.3 by the addition of about 14 ml. of a 2 N aqueous sodium hydroxide solution; the mixture is stirred for 30 minutes at 0° and for 1 hour at room temperature. A total of 120 ml. of a 1-molar dipotassium hydrogen phosphate solution, saturated with sodium chloride, is added while stirring well and the pH is adjusted to 7.0 by the addition of a 10 N aqueous sodium hydroxide solution.

The organic phase is isolated and washed twice with 40 ml. of a saturated aqueous sodium chloride solution each time. The aqueous solutions are extracted twice with 100 ml. of methylene chloride each time and the combined organic extracts are dried over magnesium sulphate, treated with a small amount of an active charcoal preparation, and then evaporated under reduced pressure. To remove the pyridine, the oily crude product is dried in a high vacuum. The residue is diluted with a small amount of diethyl ether, and cyclohexane is slowly added to the mixture, whereupon pale yellow crystals begin to precipitate. These are isolated by filtration after the mixture has been allowed to stand for one hour at 0°, washed with a mixture of diethyl ether and cyclohexane and dried to yield the 6-amino-2,2-dimethyl - 3 - (N-2,2,2-trichloroethyloxycarbonyl-amino)-penam. Additional product can be obtained by chromatographing the mother liquor on silica gel (addition of 3% of water). Pure material (thin-layer chromatography on silica gel, system toluene/acetone 1:1) is eluted with a 9:1-mixture of methylene chloride and methyl acetate and crystallizes in the form of small, colorless, shiny needles from a mixture of methyl acetate, methylene chloride and cyclohexane; M.P. 179–180° (uncorrected). Analytically pure material, melting at 181–182° (uncorrected), is obtained by recrystallizing the product once more from the same solvent mixture.

The starting material can be obtained in the following manner:

A total of 5.31 ml. of a 10 ml. solution of 2 ml. of triethylamine in tetrahydrofuran is added to a solution of 2.625 g. of penicillin-V in 30 ml. of tetrahydrofuran while stirring and cooling to −10°. A total of 3.6 ml. of a 10 ml. solution of 2 ml. of ethyl chloroformate in tetrahydrofuran is slowly added at −10° and, after the addition is complete, the mixture is stirred for 90 minutes at −10 to −5°.

The reaction mixture is treated with a solution of 0.51 g. of sodium azide in 5.1 ml. of water, the mixture is stirred for 30 minutes at 0° to −5° and then diluted with 150 ml. of ice-water and extracted three times with methylene chloride. The organic extracts are washed with water, dried and then evaporated at 25° under reduced pressure. In this manner the amorphous penicillin-V-azide is obtained in the form of a slightly yellowish oil; infra-red absorption spectrum (in methylene chloride): characteristic bands at 3.03μ, 4.46μ, 5.59μ, 5.93μ, 6.26μ, 6.62μ, 7.53μ, 8.28μ, 8.53μ, 9.24μ and 9.40μ.

A total of 3.4 ml. of a 10 ml. solution of 2 ml. of 2,2,2-trichloroethanol in benzene is added to the above solution of the 3-isocyanato-2,2-dimethyl-6-(N-phenyloxyacetyl-amino)-penam, and the reaction mixture is kept at 70° for 95 minutes. The solvent is removed under reduced pressure and the residue is purified on 40 ml. of acid-washed silica gel (column). The byproducts are washed out with 300 ml. of benzene and 300 ml. of a 19:1-mixture of benzene and ethyl acetate, and the pure 2,2-dimethyl-6-(N-phenyloxyacetyl-amino)-3-(N-2,2,2 - trichloroethoxycarbonyl-amino)-penam is eluted with 960 ml. of a 9:1-mixture of benzene and ethyl acetate. After recrystallization from a mixture of ether and pentane, the product melts at 169–171° (with decomposition); $[\alpha]_D^{20} = +83°$ (c.=1.015 in chloroform) thin-layer chromatogram (silica gel): Rf=0.5 in a 1:1-mixture of benzene and ethyl acetate; infra-red absorption spectrum (in methylene chloride): characteristic bands at 3.05μ, 5.62μ, 5.77μ, 5.93μ, 6.27μ, 6.62μ, 6.70μ, 8.30μ, 9.23μ and 9.50μ.

EXAMPLE 5

A total of 2.75 ml. of pyridine is added to a solution of 1.15 g. of 2,2-dimethyl-3-(N-phenacyloxycarbonyl-amino)-6-(N-phenylacetyl-amino)-penam in 50 ml. of methylene chloride and then 18.25 ml. of a 10% solution of phosphorus pentachloride in methylene chloride are added at −30° in a nitrogen atmosphere. The mixture is stirred for 30 minutes at −10°, cooled to −70° and then treated with 7 ml. of methanol and stirred for one hour at −40°. A total of 7 ml. of water is added at −20°. The pH is adjusted to 3.3 by the addition of a 2 N aqueous sodium hydroxide solution, the mixture is stirred for 2 hours at 0° and poured into 100 ml. of a 1-molar aqueous dipotassium hydrogen phosphate solution while stirring. Extraction is effected three times with methylene chloride and the combined organic extracts are washed twice with a saturated aqueous sodium chloride solution, dried over calcium sulphate semi-hydrate and evaporated. The residue is chromatographed on 65 g. of silica gel and the 6 - amino - 2,2 - dimethyl-3-(N-phenacyloxycarbonyl-amino)-penam of the formula

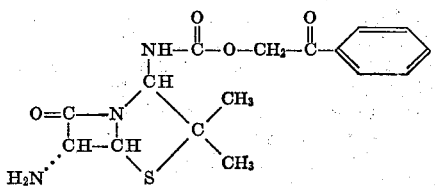

is eluted with a 1:1-mixture of toluene and acetone. In a thin-layer chromatogram (silica gel), the product shows an Rf value of 0.28 (system toluene/acetone 6:4) and of 0.04 (system toluene/acetone 8:2) with dirty yellow spots on development with Ninhydrin/collidine.

The starting material can be prepared in the following manner:

A total of 6.5 g. of phenacyl alcohol is added to a solution of 17.3 g. of 3-isocyanato-2,2-dimethyl-6-(N-phenylacetyl-amino)-penam in 150 ml. of absolute benzene. The golden-yellow solution is allowed to stand for 16 hours at room temperature; isocyanato bands can no longer be identified at 4.4μ in the infra-red spectrum (about 4% solution in methylene chloride). The reaction solution is evaporated to dryness under reduced pressure and the residue is chromatographed on a column of 800 grams of silica gel. Small amounts of unreacted phenacyl alcohol (M.P. 85–86°) are washed out with methylene chloride, containing 3% of ethyl acetate, and the 2,2-dimethyl - 3 - (N - phenacyloxycarbonyl-amino)-6-(N-phenylacetyl-amino)-penam is eluted with methylene chloride containing 5–10% of ethyl acetate. The chromatographically homogeneous fractions are combined and recrystallized from a mixture of acetone and cyclohexane. The colorless crystalline product melts at 175–178° (uncorrected); the analytical product melts at 182–183° (uncorrected) after two recrystallizations from a mixture of methyl acetate and cyclohexane; thin-layer chromatogram (silica gel plates: development with iodine vapor); Rf=0.59 (system toluene/ethyl acetate 1:1), Rf=0.82 (system toluene/acetone 1:1) and Rf=0.42 (system toluene/acetone 3:1); $[\alpha]_D^{20} = +87° \pm 1°$ (c.=0.985 in chloroform); infra-red spectrum: characteristic bands at 2.92μ, 5.59μ, 5.76μ, 5.87μ, 5.94μ, 6.31μ, 6.62μ (shoulder), 6.67μ, 8.22μ, 8.48μ, 9.22μ, 10.20μ and 10.44μ (in methylene chloride) and at 2.96μ, 3.02μ, 5.59μ, 5.86μ, 6.02μ, 6.25μ, 6.45μ, 6.58μ, 7.98μ, 8.15μ, 8.28μ, 9.15μ, 9.24μ, 9.32μ, 10.18μ, 11.47μ, 13.94μ and 14.58μ (in mineral oil).

In an analogous manner the 3-acetyloxymethyl-7-amino-4-(N-2,2,2-trichloroethoxycarbonyl - amino)-ceph-(2)em of the formula

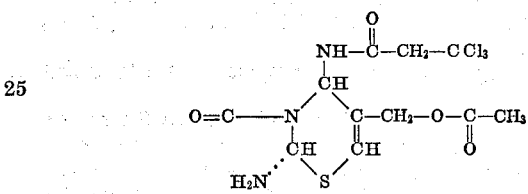

can be obtained by treating 3-acetyloxymethyl-7-(N-2-thienylacetyl-amino) - 4 - (N - 2,2,2-trichloroethoxycarbonyl-amino)-ceph(2)-em in succession with phsphorus pentachloride in the presence of pyridine, methanol and water.

The starting material can be obtained, for example, in the following manner:

A total of 1.6 ml. of pyridine is added at −30° to a suspension of 4.2 g. of the sodium salt of 3-acetyloxymethyl-7-(N-2-thienylacetyl-amino)-ceph(3)em - 4 - carboxylic acid in 30 ml. of dimethylformamide, 1.2 ml. of trichloroacetyl chloride are added in a nitrogen atmosphere and the mixture is stirred for 30 minutes at −30°. A total of 0.85 g. of sodium azide is added at the same temperature, the mixture is stirred for a further 45 minutes at −30°, and then poured into a cold mixture of toluene and a saturated aqueous sodium chloride solution. The two phases are separated; the aqueous solution is washed with toluene and the combined organic solutions are washed with a cold, aqueous dipotassium hydrogen phosphate solution (40%), dried over anhydrous calcium phosphate and concentrated to a volume of about 80 ml. under reduced pressure, and then heated for 30 minutes at 80° in a nitrogen atmosphere. After cooling to 20°, the solution is treated with 1.26 ml. of 2,2,2-trichloroethanol and with 0.1 ml. of triethylamine. The reaction mixture is allowed to stand for 2 hours at 22°, 260 ml. of hexane are added and the precipitate is isolated by filtration after 15 minutes. The filter residue is chromatographed on 60 g. of silica gel (column) and the amorphous 3-acetyloxymethyl - 7 - (N-2-thienylacetyl-amino)-4-(N-2,2,2 - trichloroethoxycarbonyl - amino) - ceph(2)em is eluted with a 9:1-mixture of toluene and acetone; thin-layer chromatogram (silica gel) Rf=0.62 (system toluene/acetone 6:4); ultraviolet absorption spectrum (in acetonitrile): λmax.=229 mμ (ε=16400); infrared absorption spectrum (in methylene chloride): characteristic bands at 2.90μ, 5.58μ, 5.72μ, 5.92μ, 6.64μ, 7.23μ, 8.18μ, 9.05μ, 9.26μ, 9.62μ, 9.75μ, 11.73μ and 12.20μ.

The compounds obtainable in accordance with the process of the invention can be used, for example, as follows:

EXAMPLE 6

A total of 0.05 g. of 6-amino-2,2-dimethyl-3-(N-2,2,2-trichloroethyloxycarbonyl-amino)-penam and 0.1 g. of zinc dust are taken up in 2 ml. of a 1:1-mixture of acetone and water, 0.2 ml. of glacial acetic acid is added and the mixture is vibrated (ultrasonic) for 1 hour at 20° with 45 kHz., then diluted with 50 ml. of water and extracted with 50 ml. of ethyl acetate. The organic phase is dried over sodium sulphate and evaporated under reduced pressure. The residue contains the 3-isopropyl-4-thia-2,6-diazabicyclo[3,2,0]heptan-7-one of the formula

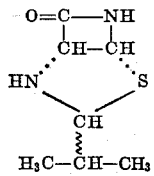

thin-layer chromatogram (silica gel): R$f$=0.17 (system toluene/acetane 8:2), and R$f$=0.38 (system toluene/acetone 6:4); M.P. 151–155° after recrystallization from a mixture of methylene chloride and hexane; infra-red absorption spectrum (in methylene chloride): characteristic bands at 2.98μ, 3.32μ, 3.40μ, 5.65μ, 7.07μ, 8.90μ, 10.51μ and 11.74μ.

The above reaction can also be carried out, when the glacial acetic acid is replaced by 0.2 g. of ammonium chloride or 0.2 g. of pyridine hydrochloride.

EXAMPLE 7

A solution of 5 g. of 6-amino-2,2-dimethyl-3-(N-2,2,2-trichloroethyloxycarbonyl-amino)-penam in 100 ml. of dimethylformamide is added to 65 ml. of a 1.7 molar aqueous chromium-(II) chloride solution, the latter being kept at 0° in a nitrogen atmosphere. After the exothermic reaction has subsided, the reaction mixture is stirred for 30 minutes at 22° in a nitrogen atmosphere, the pH value is then adjusted to 7.5 by the addition of a 50% aqueous tripotassium phosphate solution and the mixture is evaporated under a pressure of 0.1 mm. Hg. The residue is digested with methylene chloride; the insoluble residue is separated and the solution is dried over sodium sulphate and then evaporated under reduced pressure. The residue is crystallized from a mixture of tetrahydrofuran and diethyl ether to yield the 4,4-dimethyl-5-thia-2,7-diazabicyclo[4,2,0]oct-2-en-8-one of the formula

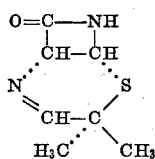

M.P. 152–153° (corrected); thin-layer chromatogram (silica gel): R$f$=0.09 (system toluene/acetone 8:2) and R$f$=0.25 (system toluene/actone 6:4); infra-red absorption spectrum (in methylene chloride): characteristic bands at 3.01μ, 3.49μ, 5.63μ, 6.07μ, 7.33μ, 7.48μ, 8.52μ, 9.27μ and 10.39μ.

EXAMPLE 8

A total of 0.051 g. of 4,4-dimethyl-5-thia-2,7-diazabicyclo[4,2,0]oct-2-en-8-one and 0.1 g. of zinc dust are taken up in a mixture of 0.5 ml. of water, 1 ml. of acetone and 0.2 ml. of glacial acetic acid and the mixture is shaken for 1 hour at 22°. After filtration, the solution is distributed between 20 ml. of ethyl acetate and 10 ml. of 1-molar aqueous dipotassium hydrogen phosphate solution; the aqueous phase is extracted with 20 ml. of ethyl acetate. The combined organic solutions are washed with 10 ml. of a 1-molar aqueous dipotassium hydrogen phosphate solution, dried over sodium sulphate and evaporated; the 3-isopropyl-4-thia-2,6-diazabicyclo[3,2,0]heptan-7-one is obtained which, according to the thin-layer chromatogram (silica gel; systems toluene/acetone 6:4 and toluene/acetone 8:2) is homogeneous and melts at 151–155° after recrystallization from a mixture of methylene chloride and hexane; infrared spectrum (in methylene chloride): characteristic bands at 2.98μ, 3.32μ, 3.40μ, 5.65μ, 7.07μ, 8.90μ, 10.51μ and 11.17μ.

EXAMPLE 9

A mixture of 0.005 g. of 6-amino-3-(N-4-methoxybenzyloxycarbonyl-amino)-2,2-dimethyl-penam and 1 ml. of trifluoroacetic acid is allowed to stand for 5 minutes at room temperature and then evaporated at 0.1 mm. Hg. The residue is taken up in a mixture of pyridine and toluene and evaporated again. The residue contains the 4,4-dimethyl-5-thia-2,7-diazabicyclo[4,2,0]oct-2-en-8-one; thin-layer chromatogram (silica gel): R$f$=0.08 (system toluene/acetone 8:2) and R$f$=0.22 (system toluene/acetone 6:4); M.P. 152–153° (corrected) after crystallization from a mixture of tetrahydrofuran and diethyl ether.

The 4,4-dimethyl-5-thia-2,7-diaza[4,2,0]oct-2-en-8-one is also obtained, when the trifluoroacetic acid is replaced by 1 ml. of formic acid and the mixture is allowed to stand for 30 minutes.

A mixture of 4,4-dimethyl-5-thia-2,7-diazabicyclo[4,2,-0]oct-2-en-8-one and zinc dust in acetone and water is treated with glacial acetic acid according to the process described in Example 8. The resulting product is the 3-isopropyl - 4 - thia-2,6-diazabicyclo[3,2,0]heptan-7-one which melts at 151–155° after recrystallization from a mixture of methylene chloride and hexane.

EXAMPLE 10

A solution of 0.26 gram of 6-amino-3-(N-2-iodoethyloxycarbonyl-amino)-2,2-dimethyl-penam in 5 ml. of tetrahydrofuran is diluted with 15 ml. of a 90% aqueous acetic acid, cooled to 0° and then treated with 2 g. of zinc dust while stirring vigorously. The reaction mixture is stirred for 10 minutes at 0° and then filtered through a filter containing a layer of a diatomaceous earth preparation. The filter residue is suspended in tetrahydrofuran, filtered, and then well washed with methylene chloride. The combined filtrates are evaporated at a low temperature under reduced pressure, the acetic acid is removed by taking the residue to dryness several times in toluene in a high vacuum, the residue is then taken up in 80 ml. of methylene chloride and 30 ml. of a saturated aqueous sodium chloride solution and shaken well. The organic phase is isolated and washed with 40 ml. of a 0.5-molar aqueous dipotassium hydrogen phosphate solution, saturated with sodium chloride, and 30 ml. of a saturated aqueous sodium chloride solution. The aqueous solutions are washed twice with 70 ml. of methylene chloride each time; the combined organic solutions are dried over magnesium sulphate and evaporated under reduced pressure. A total of 0.085 g. of the residue in methylene chloride is chromatographed on 5 g. of silica gel (containing 7% of water; column). The 3-isopropyl-4-thia-2,6-diazabicyclo-[3,2,0]heptan-7-one, M.P. 151–155° after recrystallization from a mixture of methylene chloride and hexane, is eluted with methylene chloride containing from about 10% to about 20% of methyl acetate. The 4,4-dimethyl-5-thia-2,7-diazabicyclo[4,2,0]oct-2-en - 8 - one, melting at 152–153° after crystallization from a mixture of tetrahydrofuran and diethyl ether, which is also formed, is washed out with methylene chloride containing about 50% of methyl acetate.

EXAMPLE 11

A mixture of 0.228 g. of phenyloxyacetic acid in 20.7 ml. of a 2% (by volume) solution of 0.3 g. of triethylamine in methylene chloride is treated at 10° and in a nitrogen atmosphere with 1.6 ml. of a solution of 0.255 g. of trichloroacetyl chloride in methylene chloride; the mixture is stirred for 15 minutes at −10°. A solution of 0.363 g. of 6-amino-2,2-dimethyl-3-N-(2,2,2-trichloroethoxycarbonyl-amino)-penam in 20 ml. of methylene chloride is added and the mixture is stirred for 30 minutes at 0° and for an additional 30 minutes at 20°, and then poured into a mixture of methylene chloride and a 1-molar aqueous dipotassium hydrogen phosphate solution while stirring. The organic phase is isolated; the aqueous solution is extracted twice with methylene chloride and the organic solutions are washed with the aqueous dipotassium hydrogen phosphate solution, combined and evaporated under reduced pressure. The residue is purified by chromatography on 40 ml. of acid-washed silica gel (column). The by-products are washed out with 300 ml. of benzene and 300 ml. of a 19:1-mixture of benzene and ethyl acetate and the pure 2,2-dimethyl-6-(N-phenyloxyacetyl-amino)-3-(N-2,2,2-trichloroethoxycarbonyl-amino)-penam of the formula

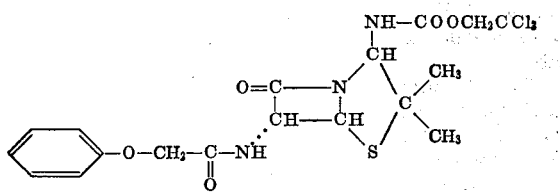

is eluted with a 9:1-mixture of benzene and ethyl acetate. After recrystallization from a mixture of ether and pentane, the product melts at 169–171° (with decomposition); $[\alpha]_D^{20} = +83°$ (c.=1.015 in chloroform); thin-layer chromatogram (silica gel): Rf=0.5 (system benzene/ethyl acetate 1:1); infra-red absorption spectrum (in methylene chloride): characteristic bands at 3.05µ, 5.62µ, 5.77µ, 5.93µ, 6.27µ, 6.62µ, 6.70µ, 8.30µ, 9.23µ and 9.50µ.

By acylating the free amino group in 6-amino-2,2-dimethyl - 3 - (N - 2,2,2 - trichloroethoxycarbonyl-amino)-penam with the tert.-butyloxycarbonyl group, for example, by treatment with tert.-butyl fluoroformate or by reaction with phosgene and treatment of the intermediate 6-(N-chlorocarbonyl-amino)-2,2-dimethyl-3-(N - 2,2,2-trichloroethoxycarbonyl-amino)-penam with tert.-butanol in the presence of calcium carbonate in a closed vessel at about 90°, there can be obtained 6-(N-tert.-butyloxycarbonyl-amino)-2,2-dimethyl - 3 - (N-2,2,2-trichloroethoxycarbonylamino)-penam of the formula

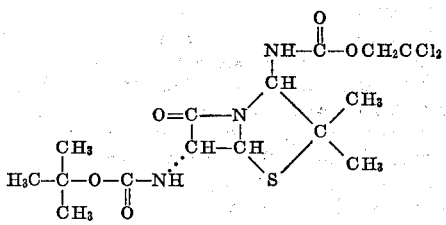

M.P. 165–167° after recrystallization from a mixture of ether and pentane; infra-red absorption spectrum (in methylene chloride): characteristic bands at 3.04µ, 5.63µ, 5.81µ, 5.84µ, 6.69µ, 7.34µ, 8.65µ, 9.16µ and 9.59µ.

By introducing the phenyloxyacetyl radical into the 6-amino - 2,2 - dimethyl-3-(N-4-methoxybenzyloxycarbonyl-amino)-penam in the manner described above, the 2,2-dimethyl-3-(N-4-methoxybenzyloxycarbonyl-amino) - 6-(N-phenyloxyacetyl-amino)-penam is obtained.

EXAMPLE 12

A total of 32.6 g. of zinc dust is added within 20 minutes, while cooling with ice, to a solution of 3 g. of crystalline 2,2-dimethyl-6-(N - phenyloxyacetyl - amino)-3-(N-2,2,2-trichloroethoxy-carbonyl - amino) - penam in 65 ml. of 90% aqueous acetic acid and 30 ml. of dimethylformamide, and the mixture is stirred for 20 minutes. The excess of zinc is removed by filtration and the filter residue is washed with benzene; the filtrate is diluted with 450 ml. of benzene, washed with a saturated aqueous sodium chloride solution and water, dried under reduced pressure and evaporated. The residue is purified on a column of 45 g. of acid-washed silica gel. Elution is effected with 100 ml. of benzene and 400 ml. of a 9:1-mixture of benzene and ethyl acetate, to yield non-polar products. Starting material is washed out with 100 ml. of a 4:1-mixture of benzene and ethyl acetate, and the 3-hydroxy-2,2-dimethy-6 - (N - phenyloxyacetyl - amino)-penam of the formula

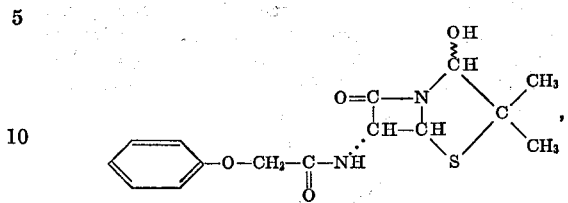

is obtained with a further 500 ml. of the 4:1-mixture of benzene and ethyl acetate and with 200 ml. of a 2:1-mixture of benzene and ethyl acetate which, as the hydrate, crystallizes spontaneously and melts within the range of from 62 to 85° after trituration with ether saturated with water.

By using chromatographed, but non-crystalline starting material and reducing in dilute acetic acid without the addition of dimethylformamide, the pure product melting at 62–70° is obtained; thin-layer chromatogram (silica gel): Rf=0.35 (system benzene/ethyl acetate 1:1); infra-red absorption spectrum (in methylene chloride): characteristic bands at 2.93µ, 3.09µ, 5.65µ, 5.96µ, 6.29µ, 6.65µ, 6.75µ, 8.57µ, 9.27µ, 10.00µ and 11.95µ.

The 3-hydroxy-2,2-dimethyl-6 - (N - phenyloxyacetyl-amino)-penam is also obtained by irradiating the 2,2-dimethyl-3-(N-4-methoxybenzyloxycarbonyl - amino)-6-(N - phenyloxyacetyl - amino) - penam in an aqueous-ethanolic solution in a quartz vessel with a medium-pressure mercury vapor lamp (main wavelength range: 254 mµ).

EXAMPLE 13

A solution of 0.5 g. of 6-(N-tert.-butyloxycarbonyl-amino)-2,2-dimethyl - 6 - (N - 2,2,2 - trichloroethoxycarbonyl-amino)-penam in 5 ml. of tert.-butanol is diluted with 4 ml. of acetic acid and 1 ml. of water. After cooling in an ice bath, 5 g. of zinc dust are added in small portions within 15 minutes while stirring. The mixture is stirred for a further 30 minutes at 0° and then filtered into a receiver containing 70 ml. of a saturated aqueous sodium chloride solution. The residue is washed with methylene chloride and the aqueous phase of the filtrate is extracted with the same solvent. The organic extracts are washed with a saturated sodium chloride solution, dried, and then evaporated under reduced pressure. The crude product so obtained can be purified by chromatography on 10 g. of acid-washed silica gel, elution first being effected with a 9:1-mixture of benzene and ethyl acetate; the 6-(N - tert. - butyloxycarbonyl - amino)-3-hydroxy-2,2-dimethyl-penam of the formula

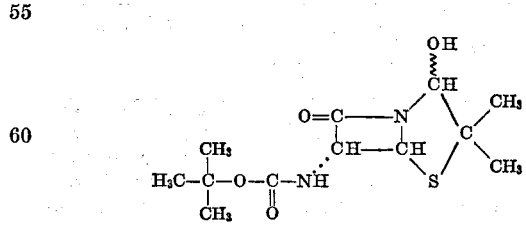

is washed out as a colorless oil with the same solvent mixture and a 4:1-mixture of benzene and ethyl acetate, M.P. 106–110° (sinters from 100° on) after crystallization from a mixture of ether and pentane;

$[\alpha]_D^{20} = +115° \pm 1°$ (c.=0.858 in chloroform); thin-layer chromatogram (silica gel: Rf ~0.53 (system benzene/ethyl acetate 1:1); infra-red absorption spectrum (in methylene chloride): characteristic bands at 2.91µ, 3.04µ, 5.64µ, 5.84µ, 6.68µ, 7.33µ and 8.60µ.

EXAMPLE 14

A solution of 0.14 g. of 3-hydroxy-2,2-dimethyl-6-(N-phenyloxyacetyl-amino)-penam in 2 ml. of dry benzene is treated with 1 ml. of acetic anhydride and 0.2 ml. of pyridine and the mixture is heated for 2 hours at 50°, then evaporated under reduced pressure. The residue is purified by chromatography on 1 g. of acid-washed silica gel, elution being effected with 10 ml. of benzene and 40 ml. of a 19:1-mixture of benzene and ethyl acetate to yield the pure 3-acetyloxy-2,2-dimethyl - 6 - (N - phenyl-oxyacetyl-amino)-penam of the formula

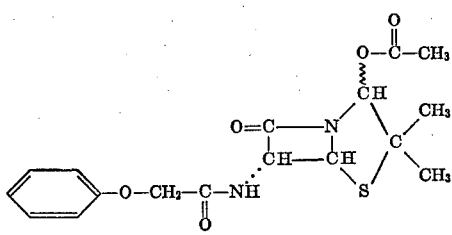

M.P. 129–131° after crystallization from a mixture of ether and pentane and recrystallization from ether; $[\alpha]_D^{20} = +85° \pm 1°$ (c.=1.135 in chloroform); infra-red absorption spectrum (in methylene chloride): characteristic bands at 3.05μ, 5.61μ, 5.74μ, 5.94μ, 6.28μ, 6.64μ, 6.72μ, 8.32μ and 9.62μ.

EXAMPLE 15

To a solution of 0.132 g. of 3-hydroxy-2,2-dimethyl-6-(N-phenyloxyacetyl-amino)-penam in 2 ml. of benzene, 0.75 ml. of a 10 ml. solution of 1 ml. of benzoyl chloride in benzene and 0.1 ml. of pyridine are added, and the mixture is stirred for 20 hours at room temperature, diluted with benzene and then washed with 0.5-molar hydrochloric acid, dilute aqueous sodium hydrogen carbonate solution and water. The aqueous washing solutions are extracted with benezne; the combined benzene solutions are dried and then evaporated under reduced pressure. The residue is chromatographed on 2.5 g. of acid-washed silica gel, non-polar impurities being washed out with 60 ml. of benzene, and the 3-benzoyloxy-2,2-dimethyl - 6 - (N-phenyloxyacetyl-amino)-penam of the formula

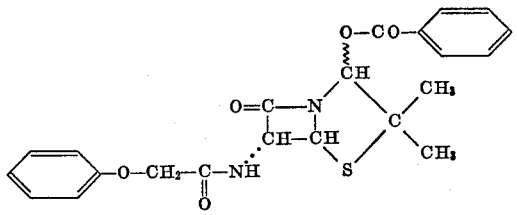

eluted with 15 ml. of a 9:1-mixture of benzene and ethyl acetate. It is obtained in the form of a pale, yellowish amorphous product; infra-red absorption spectrum (in methylene chloride): characteristic bands at 3.05μ, 5.60μ, 5.92μ, 6.26μ, 6.62μ, 6.70μ, 8.28μ, 8.5μ, 9.20μ, 9.36μ and 10.20μ.

EXAMPLE 16

A solution of 0.065 g. of 3-hydroxy-2,2-dimethyl-6-(N-phenyloxyacetyl-amino)-penam in 5 ml. of benzene is treated with 0.15 g. of lead tetraacetate containing 10% of acetic acid, and the yellow solution is irradiated with a high-pressure mercury vapor lamp (80 watt) in a water-cooled Pyrex glass mantle. After 10 minutes, the yellow color disappears and a precipitate forms which is partially white and flocculent and partially rubbery and yellow. The mixture is diluted with benzene, washed with water, a dilute aqueous sodium hydrogen carbonate solution and water, and evaporated under reduced pressure to yield the 1-formyl-2α-(2-acetyloxy-2-propyl-mercapto) - 3α - (N-phenyloxyacetyl-amino)-azetidin-4-one of the formula

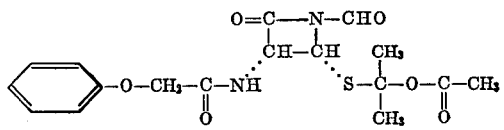

which is obtained in the form of a pale, yellowish rubber-like product; infra-red absorption spectrum (in methylene chloride): characteristic bands at 3.05μ, 5.56μ, 5.78μ, 5.90μ, 6.27μ, 6.62μ, 6.71μ, 7.33μ, 7.67μ, 8.92μ, 9.24μ and 9.82μ.

EXAMPLE 17

A solution of 0.3 g. of 6-(N-tert.-butyloxycarbonyl-amino)-3-hydroxy-2,2-dimethyl-penam in 125 ml. of anhydrous benzene is treated with 1 g. of vacuum-dried lead tetraacetate and 0.09 ml. of pyridine, and the mixture is irradiated at about 12 to 15° with a high-pressure mercury vapor lamp (Hanau; Type Q81: 80 watt) in a water-cooled Pyrex glass mantle, the mixture being agitated by conducting a stream of oxygen-free nitrogen through it. A white precipitate of lead diacetate forms; a small amount of a rubber-like black product, which very probably contains metallic lead, precipitates on the Pyrex glass mantle and is scratched off from time to time. The total amount of lead tetraacetate is consumed after one hour; the mixture is filtered, the filtrate is washed with dilute aqueous sodium hydrogen carbonate solution and water, dried under reduced pressure and evaporated. The crude 1-formyl-2α-(2-acetyloxy-2-propylmercapto) - 3α-(N-tert.-butyloxycarbonyl-amino)-azetidin-4-one of the formula

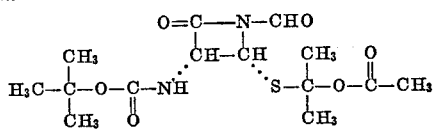

is obtained in the form of an amorphous product and can be further processed without purification; infra-red absorption spectrum (in methylene chloride): characteristic bands at 3.04μ, 5.56μ, 5.88μ, 6.70μ, 7.35μ and 8.70μ.

EXAMPLE 18

A solution of 1 g. of the hydrate of 3-hydroxy-2,2-dimethyl - 6 - (N-phenyloxyacetyl-amino)-penam in 125 ml. of anhydrous benzene is treated with 0.3 ml. of pyridine and 2.6 g. of lead tetraacetate dried under reduced pressure; the mixture is irradiated at about 15° with a high-pressure mercury vapor lamp (80 watt) in a water-cooled Pyrex glass mantle, a slow stream of nitrogen washed over pyrrogallol being conducted through it. After 3 hours, a test with potassium iodide-starch paper is only weakly positive. The mixture is filtered, washed with 100 ml. each of a dilute aqueous sodium hydrogen carbonate solution and water, dried, and evaporated under reduced pressure; the crude product contains 1 - formyl - 2α - (2 - acetyloxy-2-propyl-mercapto) - 3α - (N-phenyloxyacetyl-amino)-azetidin-4-one, which can be further processed without purification.

EXAMPLE 19

A total of 0.3 ml. of a solution of 0.38 g. of sodium borohydride in 5 ml. of water is added at 0° to a solution of 0.18 g. of 2-hydroxy-2,2-dimethyl-6-(N-phenyloxy-acettyl-amino)-penam in 5 ml. of tetrahydrofuran. The mixture is stirred for 20 minutes at 0°, the pH is adjusted to about 4 by the addition of 12 drops of acetic acid, and the mixture is then diluted with 50 ml. of methylene chloride. The organic solution is washed twice with a saturated aqueous sodium chloride solution, the aqueous washings are extracted with methylene chloride, and the combined organic solutions are dried and evaporated under reduced pressure. The crystalline residue is recrystallized from a mixture of methylene chloride and ether to yield the 2α - (2 - hydroxymethyl - 2 - propylmercapto) - 3α - (N-phenyloxyacetyl-amino)-azetidin-4-one of the formula

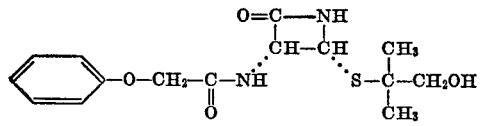

M.P. 156–157° after repeated recrystallization, the product being obtained in the form of needles;

$[\alpha]_D^{20} = +130 \pm 1°$ (c.=0.708 in chloroform); infra-red absorption spectrum (in methylene chloride): characteristic bands at 3.03μ, 5.65μ, 5.94μ, 6.26μ, 6.58μ, 6.70μ, 8.15μ, 8.26μ and 9.43μ.

EXAMPLE 20

A solution of 0.08 gram of 6-(N-tert.-butyloxycarbonylamino)-3-hydroxy-2,2-dimethylpenam in 5 ml. of tetrahydrofuran is treated at 0° with 0.13 ml. of a solution of 0.38 g. of sodium borohydride in 5 ml. of water. The reaction mixture is stirred for 20 minutes at room temperature, acidified with 5 drops of acetic acid and then diluted with methylene chloride. The organic phase is washed with a saturated aqueous sodium chloride solution, dried, and evaporated under reduced pressure. The residue is chromatographed on 0.5 g. of acid-washed silica gel, non-polar by-products being washed out with 5 ml. each of benzene and 9:1- and 4:1-mixtures of benzene and ethyl acetate. The amorphous 2α-(2-hydroxymethyl-2-propyl - mercapto)-3α-(N-tert.-butyloxycarbonyl-amino)-azetidin-4-one of the formula

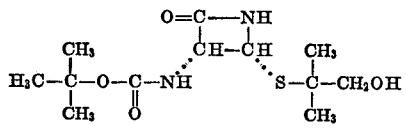

is eluted with 10 ml. of a 1:1-mixture of benzene and ethyl acetate and 5 ml. of ethyl acetate; infra-red absorption spectrum (in methylene chloride): characteristic bands at 3.03μ, 5.63μ, 5.83μ, 6.63μ, 7.31μ, 8.60μ and 9.43μ.

EXAMPLE 21

A solution of 0.05 g. of 2α-(2-hydroxymethyl-2-propylmercapto) - 3α-(N-phenyloxyacetyl-amino)-azetidin-4-one in a mixture of 0.5 ml. of acetic anhydride and 0.1 ml. of pyridine is allowed to stand for 1½ hours at room temperature. The volatile portions are then removed by distillation under an oil-pump vacuum; a few ml. of toluene are added and again distilled off. The crystalline residue is the 2α - (2-acetyloxymethyl-2-propyl-mercapto)-3α-(N-phenyloxyacetyl-amino)-azetidin-4-one of the formula

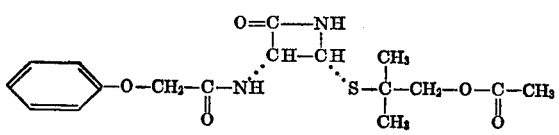

which is recrystallized from a mixture of methylene chloride and ether; M.P. 122°; $[\alpha]_D^{20} = -38 \pm 1°$ (c.=0.998 in chloroform); infra-red absorption spectrum (in methylene chloride): characteristic bands at 3.05μ, 5.64μ, 5.77μ, 5.93μ, 6.26μ, 6.58μ, 6.71μ, 7.27μ and 8.15μ.

EXAMPLE 22

A solution of 0.056 gram of 2α-(2-hydroxymethyl-2-propylmercapto) - 3α - (N-phenyloxyacetylamino)-azetidin-4-one in 1 ml. of tetrahydrofuran is treated with 0.2 ml. of a solution of 2 ml. of ethyl chloroformate, diluted to a volume of 10 ml. with tetrahydrofuran, and treated with 0.1 ml. of pyridine, the mixture being stirred at room temperature. A rubber-like precipitate forms immediately which solidifies during the course of the reaction. After 4 hours, the mixture is diluted with methylene chloride, washed with water, dried and then evaporated under reduced pressure. The resulting 2α-(2-ethoxycarbonyloxymethyl - 2 - propylmercapto) - 3α-(N-phenyloxyacetylamino)-azetidin-4-one of the formula

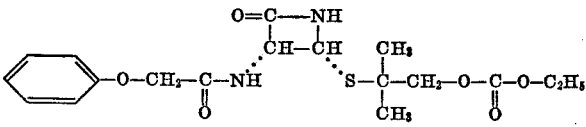

melts at 103–105°, after recrystallization from a mixture of methylene chloride and ether; $[\alpha]_D^{20} = +11° \pm 1°$ (c.=1.133 in chloroform); infra-red absorption spectrum (in methylene chloride): characteristic bands at 3.05μ, 5.63μ, 5.75μ, 5.94μ, 6.27μ, 6.60μ, 6.72μ, 8.18μ and 9.88μ.

EXAMPLE 23

A solution of 0.6 ml. of pyridine in 4 ml. of anhydrous tetrahydrofuran is added slowly, while stirring, at 0° to a solution of 0.4 g. of 2α-(2-hydroxymethyl-2-propylmercapto) - 3α - (N-phenyloxyacetyl-amino)-azetidin-4-one and 0.52 g. of 2,2,2-trichloroethoxycarbonyl chloride in 6 ml. of anhydrous tetrahydrofuran. After the addition has been completed, the mixture is stirred for 3 hours and then diluted with 100 ml. of methylene chloride; the organic solution is washed with water, dried and evaporated. The residue is chromatographed on 40 g. of acid-washed silica gel. By-products, mainly the bis-2,2,2-trichloroethylcarbonate, are washed out with benzene and with 9:1- and 4:1-mixtures of benzene and ethyl acetate. The 2α - [2 - (2,2,2-trichloroethoxycarbonyloxymethyl)-2 - propylmercapto] - 3α - (N-phenyloxyacetyl-amino)-azetidin-4-one of the formula

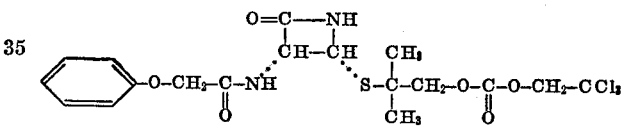

is eluted with a 1:1-mixture of benzene and ethyl acetate and recrystallized from a mixture of ether and pentane; M.P. 93–95°; $[\alpha]_D^{20} = -6° \pm 1°$ (c.=1.17 in chloroform); infra-red absorption spectrum (in methylene chloride): characteristic bands at 3.03μ, 5.63μ, 5.68μ, 5.92μ, 6.26μ, 6.69μ, 6.70μ, 7.25μ and 8.08μ.

EXAMPLE 24

A solution of 0.02 g. of 2α-(2-hydroxymethyl-2-propylmercapto) - 3α - (N - phenyloxyacetyl-amino)-azetidin-4-one in a mixture of 0.2 ml. of acetic anhydride and 0.05 ml. of pyridine is heated under anhydrous conditions for 5½ hours at 70°. The solvents are evaporated under a pressure of 1 mm. Hg; the residue is dissolved in toluene and the solvent is again evaporated under reduced pressure. The resulting 1 - acetyl - 2α - (2-acetyloxymethyl-2-propylmercapto)-3α-(N-phenyloxyacetyl-amino)-azetidin-4-one of the formula

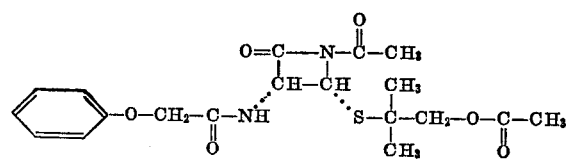

is obtained in the form of a colorless, amorphous residue; Rf=0.55 (silica gel plates; ethyl acetate); infra-red absorption spectrum (in methylene chloride): characteristic bands at 3.05μ, 5.58μ, 5.77μ, 5.84μ, 5.92μ, 6.27μ, 6.62μ, 6.72μ and 7.29μ.

EXAMPLE 25

A suspension of 0.08 g. of 2α-(2-hydroxymethyl-2-propylmercapto) - 3α-(N-phenyloxyacetylamino)-azetidin-4-one in 25 ml. of anhydrous benzene is treated with 0.3 g. of lead tetraacetate containing 10% of acetic acid, and the mixture is irradiated at about 10° with a high-pressure mercury vapor lamp (80 watt) in a water-cooled Pyrex glass mantle, while stirring. After 45 minutes, a four-valent lead compound can no longer be detected with potassium iodide-starch paper. The precipitate sticking to the wall of the vessel during the reaction is scratched off from time to time. A total of 19 of "polystyrene Hünig base" (prepared by heating a mixture of 100 g. of chloromethylpolystyrene [J. Am. Chem. Soc., 85, 2149 (1963)], 500 ml. of benzene, 200 ml. of methanol and 100 ml. of diisopropylamine to 150°, while shaking, filtering, washing with 1,000 ml. of methanol, 1,000 ml. of a 3:1-mixture of dioxane and triethylamine, 1,000 ml. of methanol, 1,000 ml. of dioxane and 1,000 ml. of methanol, drying for 16 hours at 100°/100 mm. Hg; the product neutralizes 1.55 milliequivalents of hydrochloric acid per 1 g. in a 2:1-mixture of dioxane and water) is added to the mixture, which is stirred for 5 minutes and filtered. The filtrate is evaporated at about 30 to 40° under reduced pressure; the residue contains the 2α-(2-acetyloxy-2-propylmercapto) - 3α-(N-phenyloxyacetyl-amino)-azetidin-4-one of the formula

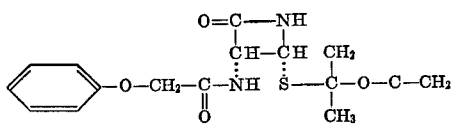

which can be processed without further purification.

The 2α-(2-hydroxymethyl-2-propylmercapto) - 3α - (N-tert.-butyloxycarbonyl-amino)-azetidin-4-one can be converted into the 2α-(2-acetyloxy-2-propylmercapto)-3α-(N-tert.-butyloxycarbonyl-amino)-azetidin-4-one in a similar manner by treatment with lead tetraacetate.

EXAMPLE 26

A mixture of 0.12 g. of 1-formyl-2α-(2-acetyloxy-2-propylmercapto) - 3α-(N-phenyloxyacetyl-amino)-azetidin-4-one in 12 ml. of anhydrous benzene is heated for 6½ hours at 80% and then evaporated under reduced pressure. The product obtained in the form of a slightly yellowish oil is the 1-formyl-2α-isopropenylmercapto-3α-(N-phenyloxyacetyl-amino)-azetidin-4-one of the formula

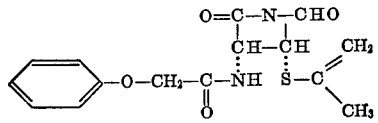

which can be purified by chromatography on acid-washed silica gel and elution with a 9:1-mixture of benzene and ethyl acetate. The amorphous product shows the following characteristic bands in the infra-red spectrum (in methylene chloride): 3.05μ, 5.56μ, 5.88μ, 6.28μ, 6.72μ and 7.68μ.

EXAMPLE 27

The crude product obtained in accordance with the process described in Example 17 containing the 1-formyl-2α - (2-acetyloxy-2-propylmercapto)-3α-(N-tert.-butyloxycarbonyl-amino)-azetidin-4-one is dissolved in 15 ml. of toluene and the solution is heated for 17 hours in a nitrogen atmosphere at 90°. Evaporation is effected under reduced pressure and the crude 1-formyl-2α- isopropenylmercapto - 3α-(N-tert.-butyloxycarbonyl-amino)-azetidin-4-one of the formula

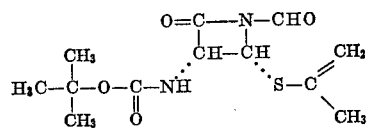

is obtained in the form of an amorphous product; infrared absorption spectrum (in methylene chloride): characteristic bands at 3.03μ, 5.55μ, 5.85μ, 6.69μ and 7.32μ.

EXAMPLE 28

The crude 1-formyl-2α-(2-acetyloxy-2-propylmercapto) - 3α - (N-phenyloxyacetyl-amino)-acetidin-4-one obtained in accordance with the process described in Example 16 is dissolved in 50 ml. of toluene and kept at 90° for 16 hours in a nitrogen atmosphere; it is then evaporated under reduced pressure. The residue contains the 1-formyl-2α-isopropenylmercapto-3α-(N-phenyloxyacetyl-amino)-azetidin-4-one, which is further processed without purification.

EXAMPLE 29

A solution of 0.051 g. of 1-formyl-2α-(2-acetyloxy-2-propylmercapto) - 3α - (N-phenyloxyacetyl-amino)-azetidin-4-one in 3 ml. of anhydrous benzene is treated with 0.13 g. of tris-triphenylphosphine-rhodium chloride and the mixture is refluxed for 3 hours. The solution, which is initially red, turns brown, and a small amount of precipitate forms. After cooling, the latter is removed by filtration and the filtrate is evaporated under reduced pressure. The residue is chromatographed on 5 g. of acid-washed silica gel, fractions of 5 ml. each being taken. Elution is effected with 10 ml. of benzene, 30 ml. of a 9:1-, 25 ml. of a 4:1- and 10 ml. of a 1:1-mixture of benzene and ethyl acetate and then with 25 ml. of ethyl acetate. Fractions 2 to 6 yield a rhodium complex having a strong —C(=O)-absorption at 5.18μ in the infra-red absorption spectrum. A small amount of 1-formyl-2α-isopropenylmercapto-3α - (N-phenyloxyacetyl-amino)-azetidin-4-one can be isolated from fractions 10 to 12, whereas fractions 15 to 17 contain the 2α-isopropenylmercapto-3α-(N-phenyloxyacetylamino)-azetidin-4-one of the formula

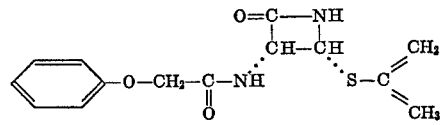

in the form of an amorphous product. The product can be obtained in a crystalline form when the eluting solution is filtered through 0.5 g. of acid-washed silica gel and elution is carried out with a 1:1-mixtue of benzene and ethyl acetate; M.P. 156–158°; [α]$_D^{20}$=—70°±2° (c.= 0.665 in chloroform); infra-red absorption spectrum (in methylene chloride): characteristic bands at 3.07μ, 5.65μ, 6.29μ, 6.59μ, 6.74μ, 8.19μ, 9.25μ and 9.92μ.

EXAMPLE 30

The crude product obtained in accordance with the process described in Example 28, containing 1-formyl-2α-isopropenylmercapto-3α - (N-phenyloxy-acetyl-amino)-azetidin-4-one, is dissolved in 45 ml. of methylene chloride, treated with 45 ml. of water and 0.9 ml. of concentrated aqueous ammonia, and the mixture is stirred vigoously for 5 hours at room temperature. The aqueous phase is washed twice with 50 ml. of methylene chloride each time, the combined organic solutions are dried, and then evaporated under reduced pressure. The residue is recrystallized from a mixture of methylene chloride and ether and yields the pure 2α-isopropenylmercapto-3α-(N-phenyloxyacetyl-amino)-azetidin-4-one, M.P. at 157–160°. The crystalline mother liquor is chromatographed on acid-washed silica gel and yields a further amount of the desired product.

EXAMPLE 31

The crude 1 - formyl-2α-isopropenylmercapto-3α-(N-tert.-butyloxycarbonyl-amino)-azetidin-4-one obtained in accordance with the procedure described in Example 27 is dissolved in 10 ml. of methylene chloride, the solution is diluted with 10 ml. of water and treated with 10 drops of concentrated aqueous ammonia. The reaction mixture is stirred vigorously for 4 hours at room temperature and then separated into the two layers; the aqueous phase is washed with methylene chloride and the organic solutions are combined, dried and evaporated. The residue is chromatographed on 15 g. of acid-washed silica gel, elution being effected with chloroform. In the first eluates, less polar byproducts are eluted, and then the desired 2α- isopropenylmercapto - 3α - (N-tert.-butyloxycarbonyl-amino)-azetidin-4-one of the formula

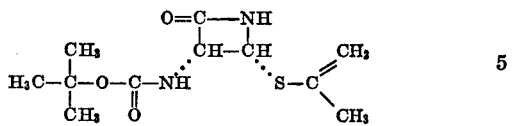

is obtained, M.P. 141° after crystallization from cold ether and at 142–144° after sublimation (128–132°/ 0.001 mm. Hg); $[\alpha]_D = -26° \pm 1°$ (c.=0.883 in chloroform); ultraviolet absorption spectrum (in ethanol): $\lambda_{max} = 223$ m$\mu$ ($\epsilon = 4840$); infra-red absoprtion spectrum (in methylene chloride): characteristic bands at 3.03$\mu$, 5.63$\mu$, 5.84$\mu$, 6.22$\mu$, 6.67$\mu$, 7.32$\mu$, 7.57$\mu$, 8.64$\mu$, 9.45$\mu$ and 11.65$\mu$.

EXAMPLE 32

Half of the crude product, containing 2α-(2-acetyloxy-2 - propylmercapto)-3α-(N-phenyloxyacetyl-amino)-azetidin-4-one obtained in accordance with the process described in Example 25 is dissolved in 5 ml. of anhydrous dioxane, the solution is kept at 100° for 17 hours and then evaporated under reduced pressure. The crude product is chromatographed on 1 g. of acid-washed silica gel. Non-polar by-products are washed out with 10 ml. of benzene and 20 ml. of a 9:1-mixture of benzene and ethyl acetate, and the crystalline 2α-isopropenylmercapto-3α-(N-phenyloxyacetylamino)-azetidin - 4 - one, M.P. 156–158°, is washed out with 30 ml. of a 4:1-mixture of benzene and ethyl acetate.

The 2α - isopropenylmercapto-3α-(N-tert.-butyloxycarbonylamino)-azetidin-4-one is obtained in a similar manner by heating 2α-(2-acetyloxy-2-propylmercapto)-3α-(N-tert.-butyloxycarbonylamino)-azetidin-4-one.

EXAMPLE 33

A mixture of 0.1 g. of 1-formyl-2α-isopropenylmercapto-3α-(N-phenyloxyacetyl-amino)-azetidin-4-one in 5 ml. of ethyl acetate is hydrogenated for one hour in the presence of 0.2 g. of a 10% palladium-in-charcoal catalyst; the mixture is filtered and the filtrate is evaporated under reduced pressure. The residue is purified by chromatography on 5 g. of acid-washed silica gel; the 1-formyl-2α-isopropylmercapto - 3α - (N-phenyloxyacetyl-amino)-azetidin-4-one of the formula

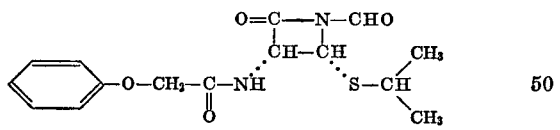

is eluted with a 4:1 mixture of benzene and ethyl acetate. 30% of the product so obtained consists of starting material; infra-red absorption spectrum (in methylene chloride): characteristic bands at 3.04, 5.56$\mu$, 5.89$\mu$, 6.26$\mu$, 6.63$\mu$, 6.72$\mu$ and 7.67$\mu$.

EXAMPLE 34

A solution of 0.08 g. of 2α-isopropenylmercapto-3α-(N-phenyloxyacetyl-amino)-azetidin-4-one in 10 ml. of ethyl acetate is stirred for 45 minutes in the presence of 0.1 g. of a 10% palladium-on-charcoal catalyst in a hydrogen atmosphere; absorption of the hydrogen ceases after about 25 minutes. The reaction mixture is filtered and the filtrate is evaporated. The crystalline residue is recrystallized from a mixture of methylene chloride and ether; the resulting 2α-isoproplymercapto-3α-(N-phenyloxyacetyl-amino)-azetidin-4-one of the formula

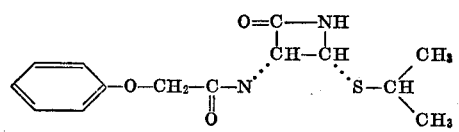

melts at 128–130° and 143° (double melting point); infra-red absorption spectrum (in methylene chloride): characteristic bands at 3.05$\mu$, 5.63$\mu$, 5.93$\mu$, 6.26$\mu$, 6.70$\mu$, 8.15$\mu$, 9.21$\mu$ and 9.41$\mu$.

EXAMPLE 35

A solution of 0.05 g. of 2α-isopropenylmercapto-3α-(N-tert.-butyloxycarbonyl-amino)-azetidin-4-one in 0.5 ml. of cold trifluoroacetic acid is kept at 0° for 15 minutes; the solution turns slightly yellowish and is then diluted with a solution of 1 g. of crystalline sodium acetate in 2 ml. of water. The mixture is extracted three times with 10 ml. of methylene chloride each time; the combined organic extracts are dried and evaporated under reduced pressure. The acetic acid is removed at 0.001 mm. Hg and the 4,4-dimethyl-azetidino [3,2-d]thiazolidin-2-one of the formula

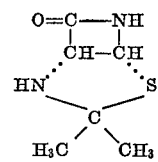

is obtained in the form of a colorless oil which crystallizes when benzene is added and melts at 115–117° after recrystallization from benzene; $[\alpha]_D^{20} = +8° \pm 1°$ (c.= 0.845 in chloroform); thin-layer chromatography (silica gel; system benzene/ethyl acetate 1:1): $Rf=0.13$; infra-red absorption spectrum (in methylene chloride): characteristic bands at 2.95$\mu$, 5.68$\mu$ (potassium bromide) and 5.78$\mu$.

EXAMPLE 36

A solution of 0.15 g. of 4,4-dimethyl-azetidino [3,2-d] thiazolidin-2-one in 10 ml. of anhydrous tetrahydrofuran (freshly filtered through a column with aluminum oxide, activity level I) is cooled to 0°. Phosgene is bubbled through the cold solution for 5 minutes and the reaction mixture is stirred for an additional 30 minutes with the exclusion of atmospheric moisture; the initially formed precipitate dissolves again. The mixture is evaporated and the residue is chromatographed on 3 g. of acid-washed silica gel. The desired 3-chlorocarbonyl-4,4-dimethyl-azetidino[3,2-d]thiazolidin-2-one of the formula

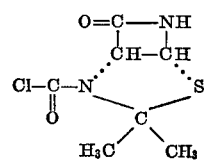

is eluted with benzene and a 9:1-mixture of benzene and ethyl acetate and crystallizes spontaneously. It is recrystallized from a mixture of benzene and hexane and melts at 178–180° (conversion at 140–160°); infra-red absorption spectrum (in methylene chloride): characteristic bands at 3.04$\mu$, 5.62$\mu$, 5.74$\mu$, 7.48$\mu$, 8.28$\mu$ and 11.84$\mu$.

A total of 0.2 g. of calcium carbonate is added to a solution of 0.1 g. of 3-chlorocarbonyl-4,4-dimehtyl-azetidino [3,2-d]thiazolidin-2-one in 10 ml. of tert.-butanol. The mixture is heated for 2½ days at a bath temperature of 90° in a closed vessel while stirring. After cooling, the mixture is filtered, the residue is washed with benzene and the filtrate is evaporated under reduced pressure. The residue is taken up in benzene; the organic solution is washed with water, dried, and again evaporated. The residue is dissolved in benzene and chromatographed on 1 g. of acid-washed silica gel. The 3-tert.-butyloxy-carbonyl- 4,4-dimethyl-azetidino[3,2 - d]thiazolin - 2 - one of the formula

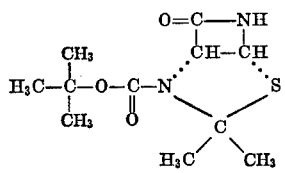

is eluted with 9:17- and 4:1-mixtures of benzene and ethyl acetate and recrystallized from a mixture of ether and pentane; M.P. 117–120° (analytical preparation: 120.5°); $[\alpha]_D^{20} = -274°$ (c.=0.522 in chloroform); thin-layer chromatogram (silica gel; system benzene/ethyl acetate 1:1): $Rf=0.15$; infra-red absorption spectrum (in methylene chloride): characteristic bands at 2.95μ, 5.62μ, 5.90μ, 7.25μ, 7.35μ, 7.75μ, 8.65μ, 9.36μ, 10.60μ, 11.65μ and 12.30μ.

What is claimed is:

1. A process for the manufacture of an amino compound of the Formula I

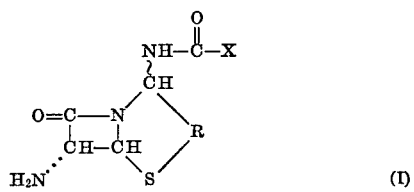

in which X represents a member selected from the group consisting of a group of the formula —O—$R_0^a$, wherein $R_0^a$ represents a 2-halogeno-lower alkyl radical, in which halogen has an atomic weight of more than 19, a group of the formula —O—$R_0^b$, in which $R_0^b$ represents phenacyl, and a group of the formula —O—$R_0^c$, wherein $R_0^c$ represents phenyl-lower alkyl, in which phenyl is unsubstituted or substituted by lower alkoxy or nitro, and R represents 2,2-propylidene, which comprises reacting a compound of the formula

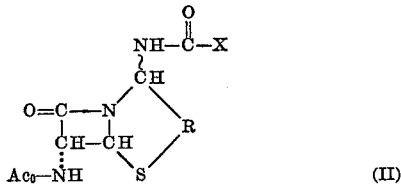

in which $Ac_0$ represents a member selected from the group consisting of phenylacetyl, phenyloxyacetyl, hydroxyphenylacetyl, lower alkanoyl, lower alkenoyl, octanoyl, 5-amino-5-carboxypentanoyl, n-butylthioacetyl and allylthioacetyl, with an acid chloride and bromide of a member selected from the group consisting of a phosphorus oxyhalide, phosphorus trihalide, phosphorus pentahalide, thionyl chloride, phosgene and oxalyl chloride, at a temperature range from about +10° C. to about —50° C.; reacting the resulting imide halide with an alcohol, at a temperature range from about +10° C. to about —50° C.; and splitting the resulting imino ether with a hydroxy compound.

2. A process as claimed in claim 1, wherein there is used a starting material of the Formula II, in which $Ac_0$ represents a member selected from the group consisting of phenylacetyl, phenyloxyacetyl, 4-hydroxyphenylacetyl, hexanoyl, octanoyl, 3 - hexenoyl, 5 - amino-5-carboxypentanoyl, n-butylthioacetayl and allylthioacetyl.

3. A process as claimed in claim 1, wherein a member selected from the group consisting of a phosphorus oxyhalide, phosphorus trihalide and phosphorus pentahalide is used.

4. A process as claimed in claim 3, wherein phosphorus pentachloride is used.

5. A process as claimed in claim 1, wherein the reaction with the reagent capable of forming an imide halide is carried out in the presence of a base.

6. A process as claimed in claim 1, wherein methanol is used.

7. A process as claimed in claim 1, wherein the imino ether is split by treatment with a member selected from the group consisting of water and an aqueous organic solvent.

8. A process as claimed in claim 1, wherein the imino ether is split at a pH value of about 1 to about 5.

9. A member selected from the group consisting of 6-amino - 2,2 - dimethyl-3-(N-2,2,2-trichloroethoxycarbonyl)-penam, 6-amino-2,2-dimethyl-3-(N-4-methoxybenzyloxycarbonyl-amino)-penam and 6-amino-3-(N-2-iodoethyloxycarbonyl-amino)-2,2-dimethyl-penam.

References Cited
UNITED STATES PATENTS

| | | | |
|---|---|---|---|
| 3,573,296 | 3/1971 | Johnson et al. | 260—243 C |
| 3,578,660 | 5/1971 | Cooper | 260—243 C |
| 3,499,909 | 3/1970 | Weissenburger et al. | 260—243 C |

NICHOLAS S. RIZZO, Primary Examiner

U.S. Cl. X.R.

260—239 A, 243 C; 424—271, 246